United States Patent
Vogt et al.

(10) Patent No.: US 12,471,697 B2
(45) Date of Patent: Nov. 18, 2025

(54) SURGICAL CLEANING DEVICE

(71) Applicant: Heraeus Medical GmbH, Wehrheim (DE)

(72) Inventors: Sebastian Vogt, Wehrheim (DE); Thomas Kluge, Wehrheim (DE)

(73) Assignee: Heraeus Medical GmbH, Wehrheim (DE)

(*) Notice: Subject to any disclaimer, the term of this patent is extended or adjusted under 35 U.S.C. 154(b) by 488 days.

(21) Appl. No.: 17/814,009

(22) Filed: Jul. 21, 2022

(65) Prior Publication Data

US 2023/0031223 A1 Feb. 2, 2023

(30) Foreign Application Priority Data

Jul. 27, 2021 (EP) ...................................... 21188046

(51) Int. Cl.
*A46B 5/00* (2006.01)
*A46B 11/00* (2006.01)
(Continued)

(52) U.S. Cl.
CPC ............ *A46B 13/00* (2013.01); *A46B 5/0066* (2013.01); *A46B 11/0006* (2013.01); *A46B 11/0072* (2013.01); *A46B 11/063* (2013.01); *A46B 13/02* (2013.01); *A46B 13/04* (2013.01); *A46B 15/0053* (2013.01); *A46D 1/0246* (2013.01); *B08B 1/12* (2024.01); *F04D 13/16* (2013.01); *F04D 29/043* (2013.01); *F04D 29/18* (2013.01); *A46B 2200/3073* (2013.01); *A61M 3/0258* (2013.01); *A61M 3/0279* (2013.01)

(58) Field of Classification Search
None
See application file for complete search history.

(56) References Cited

U.S. PATENT DOCUMENTS

| 4,583,531 A | 4/1986 | Mattchen |
| 5,542,918 A | 8/1996 | Atkinson |

(Continued)

FOREIGN PATENT DOCUMENTS

| DE | 102011018708 A1 | 10/2012 |
| EP | 3187208 B1 | 9/2018 |

(Continued)

*Primary Examiner* — Levon J Shahinian
(74) *Attorney, Agent, or Firm* — Dicke, Billig & Czaja, PLLC

(57) ABSTRACT

A surgical cleaning device and method of use having a housing, a drive shaft rotatably mounted, having a rear end and a front end, a brush head positioned at the front end and arranged outside the housing, to which a plurality of elastically deformable bristles are attached, a pump connected with the drive shaft for pumping a rinsing liquid, a gearbox that is connected with the front end of the drive shaft and with a rear end of the tube and which translates the rotational movement of the drive shaft into an oscillating linear movement of the tube and the brush head, wherein the tube is mounted movable in a linear manner; the brush head in the region of the elastically deformable bristles has at least one ejection opening, wherein the tube opens liquid-permeably through the at least one ejection opening in the direction of the elastically deformable bristles.

11 Claims, 18 Drawing Sheets

Figure 1:
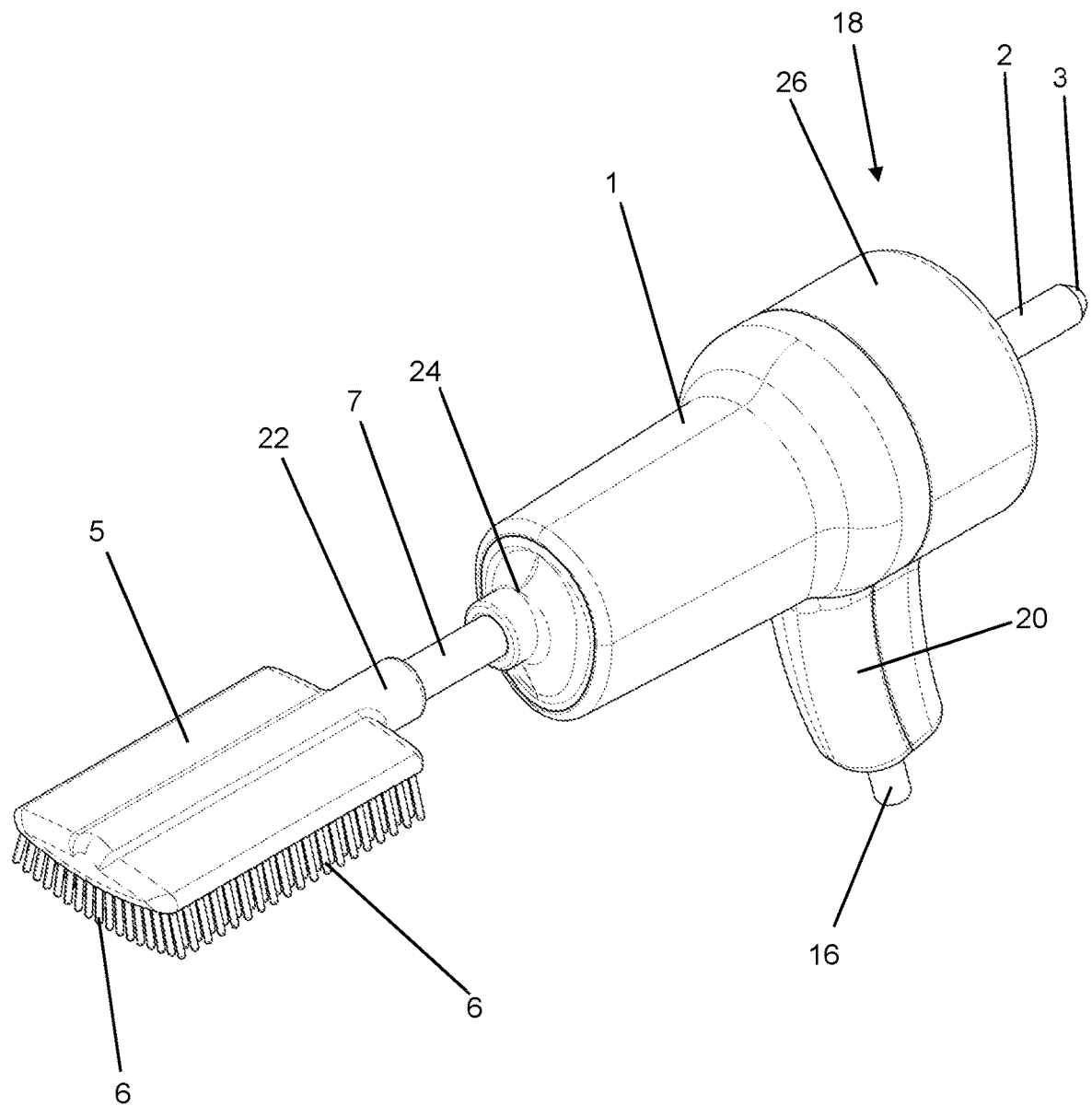

(51) Int. Cl.

| | | |
|---|---|---|
| *A46B 11/06* | (2006.01) | |
| *A46B 13/00* | (2006.01) | |
| *A46B 13/02* | (2006.01) | |
| *A46B 13/04* | (2006.01) | |
| *A46B 15/00* | (2006.01) | |
| *A46D 1/00* | (2006.01) | |
| *A61B 17/32* | (2006.01) | |
| *A61M 3/02* | (2006.01) | |
| *B08B 1/12* | (2024.01) | |
| *F04D 13/16* | (2006.01) | |
| *F04D 29/043* | (2006.01) | |
| *F04D 29/18* | (2006.01) | |

(56) References Cited

U.S. PATENT DOCUMENTS

| | | |
|---|---|---|
| 5,779,702 A | 7/1998 | Fard |
| 6,059,754 A | 5/2000 | Pasch et al. |
| 2003/0083681 A1 | 5/2003 | Connor et al. |
| 2005/0084395 A1 | 4/2005 | Kang |
| 2011/0085845 A1 | 4/2011 | Cutler |
| 2017/0318951 A1* | 11/2017 | Taghvai ............... A46B 13/02 |
| 2019/0151531 A1 | 5/2019 | Henniges |

FOREIGN PATENT DOCUMENTS

| | | |
|---|---|---|
| EP | 2939699 B1 | 12/2018 |
| EP | 3574852 B1 | 9/2020 |
| EP | 3741316 A1 | 11/2020 |
| EP | 3742316 A1 | 11/2020 |

* cited by examiner

SURGICAL CLEANING DEVICE

CROSS-REFERENCE TO RELATED APPLICATIONS

This application claims priority pursuant to 35 U.S.C. 119(a) to European Patent Application No. 21188046.3, filed Jul. 27, 2022, which application is incorporated herein by reference in its entirety.

DESCRIPTION

The invention relates to a surgical cleaning device and a method for operating such a surgical cleaning device.

The subject matter of the invention is in particular a surgical cleaning device to be used once, which is intended and suitable for cleaning infected articular endoprostheses as well as infected bone and soft tissue areas. Furthermore, other used tools and surgical instruments which were used in the context of medical surgery (or operation, OP) can also be cleaned with the surgical cleaning device. In orthopedic surgery, septic revisions of articular endoprostheses infected with microorganisms must, unfortunately, be made to a certain extent. In this case, the infected articular endoprostheses are explanted and the infected or necrotic tissue is removed. This removal of infected/necrotic tissue is referred to as debridement. The explanted articular endoprostheses must also be cleaned.

Currently known in medicine are units driven by compressed air and with electrical energy. External drive units of this kind are present in operating theaters (OTs) and can be used for a variety of purposes.

In septic bone surgery, the cleaning of degraded bone and soft tissue areas during the revision of infected articular endoprostheses and the cleaning of infected osteosynthesis plates by lavaging is state of the art. Medical rinsing devices, so-called lavage systems, are used for this purpose. As liquids, physiological saline solution, ringer's solution and Ringer's lactate solution are common. The aim of lavaging is the removal of residues of the infected tissue, biofilm residues, blood and wound secretions. Lavage systems have been known for a long time. Devices and drives for this purpose are mentioned by way of example in accordance with the documents DE 10 2011 018 708 A1, EP 2 939 699 B1, EP 3 187 208 B1, EP 3 574 852 A1, EP 3 742 316 A1, U.S. Pat. Nos. 4,583,531 A, 5,542,918 A, 5,779,702 A, 6,059,754 A, US 2003/0083681 A1, US 2005/0084395 A1 and US 2019/0151531 A1

Debriding and cleaning can be carried out by wound rinsing with so-called lavage systems and by cutting out, rasping, sawing and also brushing. A device for brushing and sawing is known, for example, from EP 3 741 316 A1, EP 3 574 852 A1 and the not pre-published EP 21154092. The devices used are contaminated after debridement with tissue residues and with microbial germs. For new use, these instruments must be carefully cleaned and then sterilized. In this case, the medical personnel must protect against contamination or infection by transferring microbial germs during the cleaning work. It is therefore desirable to provide an inexpensive surgical cleaning device which, after a single use, could be disposed of together with the usual surgical waste without elaborate and hazardous cleaning steps. It would then be expedient, particularly for reasons of resource and environmental protection, for reasons of cost, if no batteries, accumulators and electric motors, which contain non-ferrous metals, would be necessary for the drive and therefore have to be recycled in a complicated manner. After mechanical cleaning or processing, a debridement must often additionally take place in order to remove possibly infectious residues such as chips that have been produced during mechanical processing. For this purpose, a further work step is required and all devices used must subsequently be disinfected or disposed of in a complicated manner.

The object of the present invention is to overcome the disadvantages of the current state of the art. In particular, the object of the invention is to develop a surgical cleaning device to be used once, which is intended for cleaning infected articular endoprostheses and infected bone and soft tissue areas. The device should be as simple as possible cost-effective to manufacture. Furthermore, the device should be sterilized by ethylene oxide or gamma sterilization. The surgical cleaning device is to be simple in the application and requires as few working steps as possible.

The surgical cleaning device should be able to be temporarily connected with an operating drive unit operated with batteries or accumulators commonly used in OTs, wherein the connected drive unit drives the surgical cleaning device. The cleaning of tissue areas is intended to take place mechanically by the action of vibrating elastically deformable bristles and at the same time by one or more non-pulsed or pulsed rinsing liquid jets, wherein the rinsing liquid is to be guided from the outside into the device through a hose feed line. The rinsing liquid is then to be sucked in by a pump contained in the device and then ejected again in the form of spray jets. These rinsing liquid jets are intended to exit from the cleaning device in the region of the brushes. The cleaning device must be designed in such a way that it can be disposed of after the cleaning of the usual clinical waste.

It would be advantageous if the cleaning device, after use, can be disposed of hygienically by combustion. The surgical cleaning device must be sterile to be surgically applicable. The surgical cleaning device should, as far as possible, be able to be disposed of by combustion together with other clinical wastes when cleaning is complete. The surgical cleaning device should be able to be driven by a drive unit that is common for medical operations.

The objects underlying the present invention are achieved by a surgical cleaning device comprising a housing,
- a drive shaft, wherein the drive shaft is rotatably mounted in the housing, wherein the drive shaft has a rear end for connection to a drive unit, and wherein the drive shaft has a front end arranged opposite the rear end,
- a brush head, wherein the brush head has a plurality of elastically deformable bristles attached to the brush head, and wherein the brush head is arranged outside the housing,
- a pump for pumping a rinsing fluid, the pump being connected to the drive shaft and being driven by the drive shaft,
- a tube, wherein the brush head is arranged at a front end of the tube, wherein the tube is mounted in a linearly movable manner against the housing and wherein the brush head has at least one ejection opening in the region of the elastically deformable bristles, wherein the tube opens in a liquid-permeable manner through the at least one ejection opening in the direction of the elastically deformable bristles, and
- a gearbox, wherein the gearbox is connected to the front end of the drive shaft and to a rear end of the tube, and wherein the gearbox translates the rotational movement of the drive shaft into an oscillating linear movement of the tube and the brush head.

The rear end of the tube is arranged opposite the front end of the tube.

The tube can preferably be connected to a rinsing liquid reservoir.

Preferably, the tube projects out of the housing with the front end, while the rear end of the tube is positioned within the housing.

So that the tube can open in a liquid-permeable manner through the at least one ejection opening of the brush head in the direction of the elastically deformable bristles, liquid-permeable lines must be provided in the brush head, these are connected to the front end of the tube on the one hand and to the at least one ejection opening on the other side. This is preferably realized in that the brush head is a hollow body with an inner cavity, wherein the tube is connected to the cavity of the brush head in a liquid-permeable manner, and wherein the at least one ejection opening is realized by at least one bore in a wall of the brush head which connects the cavity to the surroundings of the brush head. In this case, it can also be provided that at least one bristle of the elastically deformable bristles is hollow on the inside and is connected to the bore in a liquid-permeable manner.

The surgical cleaning device according to the invention is characterized in that it has no motor and no electrical energy store. As a result, the surgical cleaning device can be manufactured cost-effectively as a hygienically disposable product for medical applications and, in particular, consist of plastic that can be burnt easily and without residue.

It can therefore be provided that the surgical cleaning device is made of plastics, in particular of plastics materials which can be disposed of by combustion.

In order to be surgically applicable, it is essential that the surgical cleaning device is sterile or at least all surfaces of the cleaning device can be sterilized, such as by Gamma radiation sterilization or by sterilization with ethylene oxide. For this purpose, it can preferably be provided that the surgical cleaning device is contained in a packaging that is permeable to ethylene oxide.

The rear end of the drive shaft can be designed as a connection for connecting to an external drive unit, in particular as a square bar, a hexagon rod or generally as a polygonal rod.

It can preferably be provided that the pump is arranged in the interior of the housing.

It can be provided that the surgical cleaning device has a first liquid line, wherein the first liquid line is connected to the rear end of the tube in a liquid-permeable manner and is fixed at the rear end of the tube and is fixed relative to the housing at an end opposite the rear end of the tube, wherein the first liquid line is preferably a flexible movable tube firmly connected to the rear end of the tube at a first end of the tube.

As a result, during operation of the surgical cleaning device, a rinsing liquid can be fed through the first liquid line into the oscillating tube, wherein the first liquid line receives the linear oscillating movement and provides an access for the rinsing liquid that is fixed against the housing.

For this purpose, the tube can preferably be connected or is connectible to a rinsing liquid reservoir via the first liquid line.

Furthermore, it can be provided that the surgical cleaning device has a second liquid line, wherein the second fluid line is connected to the pump in such a way that a rinsing liquid can be sucked from the pump through the second liquid line into the pump and wherein the first liquid line is connected to the pump in such a way that a rinsing liquid can be pressed from the pump into the second liquid line from the pump.

As a result, the rotating drive shaft cannot only drive the linear oscillating movement of the brush head, but also drive the jet of rinsing liquid. In addition to the drive unit for driving the rotation of the drive shaft, the surgical cleaning device then only requires a rinsing liquid reservoir, from which the pump can suck the rinsing liquid with the second liquid line.

In surgical cleaning devices with a second liquid line, it can be provided that the pump is connected to the drive shaft in such a way that, at least when the drive shaft is at a standstill, the second liquid line in the pump is separated from the first liquid line in a liquid-impermeable manner or is sealed off, wherein the second liquid line is preferably connected to the first liquid line in a liquid-conducting manner during a rotational movement of the drive shaft.

The separation or locking can take place by mechanical blocking within the pump. This makes it possible to prevent contaminated washing liquid from being able to penetrate through the first liquid line and the pump into the second liquid line and then to contaminate a Reservoir for the rinsing liquid there without a separate or additional valve system being necessary for this purpose. As a result, the surgical cleaning device can be constructed as an inexpensive and hygienically disposable product. The pump is connected to the drive shaft which, when the drive shaft is not rotated, bridge the rinsing liquid flow of the rinsing liquid starting from the second liquid line by mechanically blocking the connection between the second liquid line and the first liquid line and releases the rinsing liquid flow from the second liquid line to the first liquid line when the drive shaft rotates. As a result, it is possible to keep the device easily and cost-effectively by dispensing with valves and check valves.

The tube can preferably be connected or can be connected to a rinsing liquid reservoir via the second liquid line, the pump and the first liquid line.

Furthermore, it can be provided that the pump is a self-suction pump which is connected directly to the drive shaft, wherein the self-suction pump is positioned in the housing.

This achieves a particularly simple construction. In addition, it is thus ensured that the oscillating movement of the brush head causes a simultaneous discharge of rinsing liquid to thus combine the two cleaning effects. A self-aspirating pump in the surgical cleaning device has the advantage that the surgical cleaning device can itself suck in rinsing liquids, such as physiological saline solution, Ringer's solution or Ringer's lactate solution, and this is then ejected in the form of irrigation liquid jets from the surgical cleaning device.

It can also be provided that the pump is an impeller pump which is arranged on the drive shaft, wherein the impeller pump has a Rotor with impeller blades, wherein the Rotor is connected to the impeller blades in a force-fitting and/or form-fitting manner with the impeller blades.

This achieves a particularly simple and cost-effective design. At the same time, the second liquid line and the first liquid line are separated from one another by the impeller blades in the impeller pump and contamination of the rinsing liquid by contaminated used washing liquid is thus prevented in a simple manner and without a valve system.

The pump is connected to the drive shaft which, when the drive shaft is not rotated, seals the rinsing liquid flow from the second liquid line by mechanically blocking the connection between the second liquid line and the tube, and releases the rinsing liquid flow from the second liquid line to the tube when the drive shaft rotates.

It can also be provided that the gearbox is arranged in the interior of the housing.

As a result, the movement of the gearbox is protected against disturbances from outside of the surgical cleaning device.

Furthermore, it can be provided that the housing has a handle for holding the surgical cleaning device with one Hand, and wherein the housing has an opening for the rear end of the drive shaft.

As a result, the surgical cleaning device can be used safely and conveniently manually. In addition to protecting the parts located therein, such as the drive shaft, the gearbox and the first liquid line, the housing can additionally be used to form a protected cavity for other parts of the surgical cleaning device.

According to a preferred development, it can be provided that the drive shaft is rotatable and driven by a separate drive unit, wherein the separate drive unit is connected or connectible to the rear end of the drive shaft for this purpose, in particular is detachable connected or connectible.

The separate drive unit may be an external drive unit.

As a result, the surgical cleaning device does not require its own motor and no energy store. As a result, the surgical cleaning device can be manufactured for single use and be disposed of as a hygienically disposable product by burning.

To remove the used rinsing liquid, it can be provided that the surgical cleaning device has a suction device with at least one suction opening in the region of the elastically deformable bristles, wherein the suction device has a suction line which can be connected or is connected to a vacuum source.

As a result, the used rinsing liquid can be sucked off and removed from the object to be cleaned.

It can preferably be provided that the suction device is connected or can be connected to a separator for separating solid components from the used rinsing liquid and/or the vacuum source has a vacuum pump which is part of the surgical cleaning device and which can be driven by the drive shaft.

As a result, the used rinsing liquid does not have to be removed or processed in another way with a separate device. It can preferably be provided that a suction tube of the suction device surrounds the tube in regions or is guided parallel to the tube, wherein the suction tube is particularly preferably attached to the tube.

It can also be provided that the tube is at least partially surrounded by an outer tube, wherein the intermediate space between the inner wall of the outer tube and the outer wall of the tube is connected to an external suction system.

Furthermore, it can be provided that the surgical cleaning device is made of plastic, wherein the entire surgical cleaning device can preferably be disposed of free of residue after combustion.

As a result, the surgical cleaning device can be used as a hygienically disposable product in the medical field and can also be manufactured cost-effectively.

Further, it may be provided that the surgical cleaning device has a flexible drive shaft extension, wherein the flexible drive shaft extension is connected or connectible to the rear end of the drive shaft, and wherein the flexible drive shaft extension is connectible to an external drive unit such that the drive shaft with the external drive unit is rotatable against the housing via the flexible drive shaft extension.

As a result, the external drive unit can be placed away from the elastically deformable bristles of the surgical cleaning device and thus from the location of the cleaning, so that the external drive unit, which contains a Motor, does not have to be soiled and therefore does not have to be cleaned in a complicated manner.

Furthermore, it can be provided that the brush head is a hollow body and that at least one ejection opening connects an interior of the hollow body to the surroundings in the region of the elastically deformable bristles, wherein the tube opens out into the at least one ejection opening via the interior of the hollow body.

As a result, the rinsing liquid can be guided through the tube and the hollow brush head to at least one ejection opening. At the same time, the construction is simple and weight and material can be saved, which does not have to be burnt after cleaning has taken place.

It can also be provided that the surgical cleaning device has a resetting element with which the tube is pressed in the direction of the drive shaft, wherein the resetting element is preferably at least one spiral spring, wherein particularly preferably at least one coil spring is arranged around the tube and/or around a shaft for connecting the tube to the gearbox and is mounted against the housing.

As a result, it can be ensured that the tube is always in contact with the drive shaft and thus the gearbox always fulfills its function. The resetting element thereby causes a linear backward movement after a forward movement forced by the gearbox and the drive shaft.

The spiral spring can be manufactured from stainless steel, plastics or also from non-corrosive metal alloys of any composition.

According to a preferred development of the present invention, it can also be provided that the gearbox has a plate at the front end of the drive shaft or at the rear end of the tube, wherein the plate has a surface inclined against the axis of rotation of the drive shaft, or the gearbox has a first plate at the front end of the drive shaft and a second plate at the rear end of the tube, wherein the first plate and the second plate each have a surface inclined against the axis of rotation of the drive shaft, wherein the inclined surfaces of the first plate and the second plate are aligned with one another.

In this way, a particularly simple and cost-effective gearbox can be realized. The structure with the plate or the first plate and the second plate can also be made in a simple manner from plastic because the surgical cleaning device does not require a long shelf life as a disposable product. The wear is therefore not important for the present application.

The inclined surface of the plate preferably has an inclination between 5° and 45° to the axis of rotation of the drive shaft or the inclined surface of the first plate and/or the inclined surface of the second plate have an inclination between 5° and 45° to the axis of rotation of the drive shaft.

Furthermore, it can be provided that the resetting element is pressed against the drive shaft or the rear end of the tube is pressed against the drive plate or the second plate is pressed against the first plate.

It can particularly preferably be provided that the gearbox has a first plate which is connected to the front end of the drive shaft or which is attached to the front end of the drive shaft, wherein the first plate is positioned obliquely to the axis of rotation of the drive shaft, and the gearbox has a second plate, wherein the second plate is connected to the rear end of the tue, or the second plate is attached to the rear end of the tube, and wherein the second plate is placed at an angle to the longitudinal axis of the tube or obliquely to the axis of rotation of the drive shaft, and wherein the second plate is pressed against the first plate by an elastic resetting element.

This means that when the drive shaft rotates, the first plate rotates and is pressed against the second plate arranged at the rear end of the tube at an angle to the longitudinal axis. The second plate cannot rotate with the first plate if a movement of the tube is prevented by a guide. Due to the inclination of the first plate, the second plate is moved axially in the direction of the brush head. The amount of axial movement is defined by the distance of the farthest and the next point of the first plate with respect to the longitudinal axis of the drive shaft. As a result of the guide, only an axial or linear movement of the tube is possible. As a result, the oblique first plate presses against the non-rotating second plate during its Rotation and presses it periodically in the direction of the brush head. By means of the resetting element, the second plate and thus the tube is pressed back again in the direction of the first plate after the axial or linear deflection has taken place in the direction of the brush head. This results in an axial forward and backward movement of the second plate and the tube with the brush head during each revolution of the first plate.

Furthermore, it can be provided that a guide in the housing prevents a rotational movement of the tube against the housing, wherein preferably the housing or a guide of the housing guides the linear movement of the tube.

This ensures that the tube and thus the brush head cannot inadvertently rotate with the drive shaft.

Furthermore, it can be provided that the brush head is connected to the tube via a releasable connection.

This enables a brush head suitable for the respective application to be put on.

Provision can also be made for a flexible bendable tube section to be arranged between the brush head and the tube or in the tube, which tube section permits buckling of the brush head against the longitudinal axis of the tube by up to 45°, wherein the flexibly bendable tube section is preferably designed as a sleeve.

It is thus also possible for difficult-to-access regions to be made accessible with the brush head. The flexibly bendable tube section is preferably arranged outside the housing.

Furthermore, it can be provided that at least one tubular elastic bristle is provided as at least one elastic bristles, wherein at least one tubular elastic bristle is hollow on the inside and is connected to the tube in a liquid-permeable manner, wherein preferably a free opening of the at least one tubular elastic bristle is an ejection opening of the at least one ejection opening.

As a result, the rinsing liquid can be applied directly at the location by the at least one tubular elastic bristles at which the mechanical effect of the at least one tubular elastic bristles develops. As a result, a stronger cleaning effect can be achieved and/or the volume flow of the rinsing liquid can be reduced, which is advantageous for certain applications of the surgical cleaning device.

It can be provided that the elastic deformable bristles are hollow and have ejection openings on the bristle ends facing away from the brush head.

It can also be provided that at least one cam is attached to the drive shaft and an elastically deformable hose is connected to the rear end of the tube, wherein the elastically deformable tube is arranged in the operative region of the cams in such a way that, when the drive shaft is completely rotated about its longitudinal axis, a flow of rinsing liquid through the elastically deformable tube is interrupted at least once per revolution of the drive shaft and pulsating rinsing liquid jets thereby exit from the at least one ejection opening.

As a result, a rinsing liquid flow which exits through the at least one ejection opening is interrupted at least once per revolution of the drive shaft and pulsating rinsing liquid jets are produced. This improves the cleaning effect of the surgical cleaning device.

Furthermore, it can be provided that the at least one ejection opening is formed and arranged relative to the elastically deformable bristles in such a way that a jet of the rinsing liquid ejected through at least one ejection opening meets the operative area of the linearly oscillating elastically deformable bristles.

The operative area of the linearly oscillating elastically deformable bristles is the region covered by the free ends of the elastically deformable bristles opposite to a connection of the elastically deformable bristles to the brush head, in the linear oscillating movement of the elastically deformable bristles. This is the region of the surgical cleaning device provided for mechanical cleaning with the aid of the elastically deformable bristles.

By the impingement of the jet of the rinsing liquid in the operative area of the linearly oscillating elastically deformable bristles, a particularly good cleaning effect is achieved, since the particles mechanically detached from the elastic deformable bristles can be transported away from the flow of the rinsing liquid.

The objects underlying the present invention are also solved by a method for operating a surgical cleaning device, the method comprising the following steps:

A) rotating a drive shaft of the surgical cleaning device in a housing of the surgical cleaning apparatus;

B) translating the rotation of the drive shaft into a linear oscillating movement of a tube and a brush head attached to a front end of the tube with a gearbox, wherein the tube is mounted linearly movable in the housing;

C) pumping of a rinsing liquid through the linearly oscillating tube to at least one ejection opening in the brush head, wherein the pumping of the rinsing liquid is carried out with a pump, wherein the pump is driven with the rotating drive shaft; and D) injecting of at least one ejection opening into the effective region of the elastically deformable bristles.

The method can be used, for example, for cleaning a used explanted prosthesis so that it can subsequently be reused. However, it is also possible with the method to clean other new and used implants or new or used medical instruments prior to use.

In particular, it can be intended that the method is not used for a medical or therapeutic treatment of a patient.

Preferably, in the case of methods according to the invention, an application of non-patentable medical methods is excluded As already stated, the method can be used for cleaning surgical tools and explanted implants that are not connected to the body of a patient, so that there is then no medical application directly acting on the body.

The rotation of the drive shaft preferably takes place in a motor-driven manner and particularly preferable above an external drive device.

In the method according to the invention, it can be provided that the method is carried out with one of the previously described surgical cleaning devices according to the invention.

The method then has the advantages described for the surgical cleaning device.

It can also be provided that the rinsing liquid is sprayed in an unpulsed manner into the effective range of the linearly oscillating elastically deformable bristles, or is pulsed with the rotating drive shaft.

As a result, the rotating drive shaft cannot only drive the linear oscillating movement of the brush head, but also drive the jet of rinsing liquid. In addition to the drive unit for driving the rotation of the drive shaft, the surgical cleaning device then only requires a rinsing liquid reservoir, from which the pump can suck the rinsing liquid with the second liquid line.

Furthermore, it can be provided that before step A) the surgical cleaning device, in particular the tube or the pump, is connected to a rinsing liquid reservoir.

This makes it clear that the method according to the invention can be carried out with the aid of an external reservoir of the rinsing liquid.

Furthermore, it can be provided that the used rinsing liquid from the region of the bristles is at least partially sucked off with a suction device, wherein solid particles of the used rinsing liquid are preferably separated from the liquid components after the suction with a separator.

As a result, the cleaning effect of the method can be increased and contamination of the surroundings can be reduced.

Preferably, it can also be provided that before step A) the surgical cleaning device is connected to a drive unit, wherein the rotation of the drive shaft in steps A) to D) is driven with the drive unit, wherein the drive unit is preferably connected to a rear end of the drive shaft.

This makes it clear that an external drive unit for driving and rotating the drive shaft of the surgical cleaning device can be used or used.

Furthermore, it can be provided that in step B) a first plate which is inclined against the axis of rotation of the drive shaft and is attached to a front end of the drive shaft rolls on the rear end of the linearly movable tube or on a second plate inclined against the axis of rotation of the drive shaft, wherein the second plate is preferably pressed against the first plate with a resetting element.

In this way, a gearbox can be realized in a simple manner by means of which the rotation of the drive shaft can be translated into a linearly oscillating movement.

The invention is based on the surprising finding that a surgical cleaning device can be used by the drive of a single rotating drive shaft both for operating a linearly oscillating brush with elastically deformable bristles, and the rotation of the drive shaft can also be used simultaneously for generating a pulsed or non-pulsed current of a rinsing liquid in the effective range of the elastically deformable bristles by driving a pump with the drive shaft. In this case, the drive shaft can be driven with a drive unit which is normal in the operating environment and the surgical cleaning device can be constructed in a simple and cost-effective manner in such a way that the surgical cleaning device can be manufactured as a cost-effective disposable product which enables hygienic disposal after a single use. In particular, a very extensive and even complete production of the surgical cleaning device made of plastic is possible, which can be burnt without residue. The surgical cleaning device can be constructed as a simple attachment for attaching to an external drive unit. The structure according to the invention makes it possible for the surgical cleaning device to be produced very largely or completely from plastic, thereby enabling hygienic disposal by combustion with other surgical waste.

At the same time, the workflow is simplified when the surgical cleaning device is used in that the steps of mechanically removing residues and rinsing the cleaned surface with washing liquid can take place at the same time. The cleaning effect is increased here. In particular when using a flexible drive shaft extension, the external drive unit can be arranged so far from the area to be cleaned that contamination of the drive unit can be prevented. By means of these measures, a complicated cleaning of the surgical cleaning device and of the external drive unit can be dispensed with and as a result the risk of insufficient cleaning and, as a result, the risk of dangerous infection when the surgical cleaning device and the drive unit are used again after cleaning has been applied, can be reduced or ruled out.

The surgical cleaning device according to the invention can be driven by a drive device normal in the operation environment. Cleaning with the surgical cleaning device is carried out by oscillating brushes with elastically deformable bristles and by one or more non-pulsed or pulsed rinsing liquid jets.

According to the invention, the cleaning of tissue areas takes place mechanically by the action of the elastically deformable bristles and at the same time by one or more non-pulsed or pulsed rinsing liquid jets, wherein the rinsing liquid can be guided from the outside through a hose feed line or a liquid line into the device. According to the invention, the rinsing liquid is sucked in by the pump contained in the surgical cleaning device and then ejected again in the form of spray jets. These rinsing liquid jets flow either non-pulsed or pulsed out of the surgical cleaning device. Furthermore, it is possible to design the surgical cleaning device with the aid of an suction device in such a way that the used rinsing liquid can be at least partially removed again from the cleaned tissue area after cleaning has been carried out using the surgical cleaning device.

The simultaneous application of linearly oscillating elastically deformable bristles and at least one spray jet of a rinsing liquid and the structure of the surgical cleaning device according to the invention enable, synchronously to the drive of the linearly oscillating elastically deformable bristles, rinsing liquid at the same time can be sprayed out and, if appropriate, also the used rinsing liquid can be sucked in again, so that a cleaning effect can take place by the simultaneous action of the linearly oscillating elastically deformable bristles together with rinsing liquid jets. The impurities mechanically removed mechanically by the linearly oscillating elastically deformable bristles are flushed away by the simultaneously acting rinsing liquid jets. This prevents renewed adhesion of the impurities to the cleaned surfaces.

Electric drive units for surgical tools are common worldwide in surgery and orthopedics. These are used for driving oscillating saws and for drilling. Storage batteries are usually used as the energy source for such drive units. The surgical cleaning device according to the invention can easily be connected with the rear end of the drive shaft via a drill chuck with the external drive unit. The medical user holds the drive unit with one hand and actuates the drive device with the other hand. By firmly holding the surgical cleaning device, the surgical cleaning device is prevented from rotating with the drive shaft. When a drive shaft extension is used, the external drive unit can also easily be set up and fixed at a remote location and the user must hold only the surgical cleaning device.

An exemplary surgical cleaning device according to the invention is composed of:

a) a housing, b) a freely rotatable drive shaft protruding from the housing with a rear shaft end intended for connection to a drive device,
c) a front shaft end arranged inside the housing,
d) a liquid feed line connected to a liquid reservoir,
e) a pump positioned inside the housing and connected to the drive shaft, the pump being fluidly permeable to the liquid supply line,
f) a tube arranged axially movable in the housing having a rear tube end and a front tube end and protruding from the housing, the tube being fluidly permeable connected to the pump,
g) a hollow body as a brush head, which is connected to the front tube end in a liquid-permeable manner, which has elastic bristles and ejection openings on at least one side, wherein the ejection openings connect the interior of the hollow body to the environment,
h) an elastic resetting element which presses the tube in the direction of the front shaft end,
i) a gearbox arranged between the front shaft end and the tube that converts the rotational movement of the drive shaft into an oscillating linear movement of the tube, wherein
j) during the rotational movement of the drive shaft, an oscillating axial linear movement of the tube with the hollow body with the elastic bristles and simultaneously a suction of the rinsing liquid and a spraying out of the rinsing liquid from the ejection openings of the hollow body are carried out with the aid of the pump.

An exemplary method according to the invention for cleaning with a surgical cleaning device can have the following steps:
a) connecting the surgical cleaning device to a drive unit,
b) connecting the cleaning device to a rinsing liquid reservoir,
c) rotating the drive shaft,
d) generating a linear oscillating movement of a tube with a brush head attached thereto in the form of a hollow body and elastically deformable bristles attached to the brush head, wherein the linear oscillating movement is driven by means of a gearbox from the rotation of the drive shaft,
e) driving a pump by the rotational movement of the drive shaft,
f) pumping the rinsing liquid with the pump, wherein the rinsing liquid exits pulsed or non-pulsed from at least one spray opening.

In one variant of the method, the used rinsing liquid is sucked off with an outer tube and an external suction device.

Figure 2:
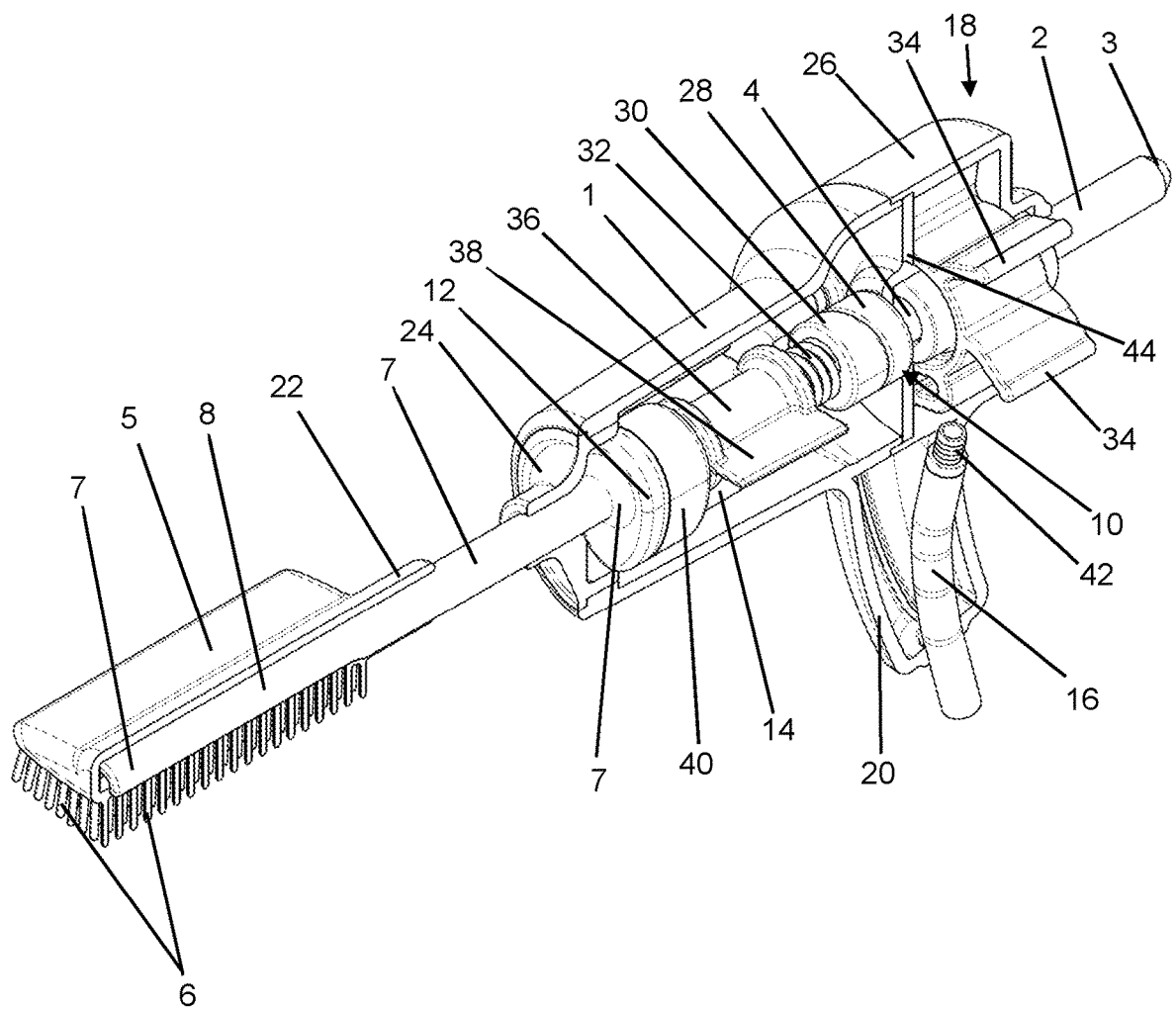
Figure 3:
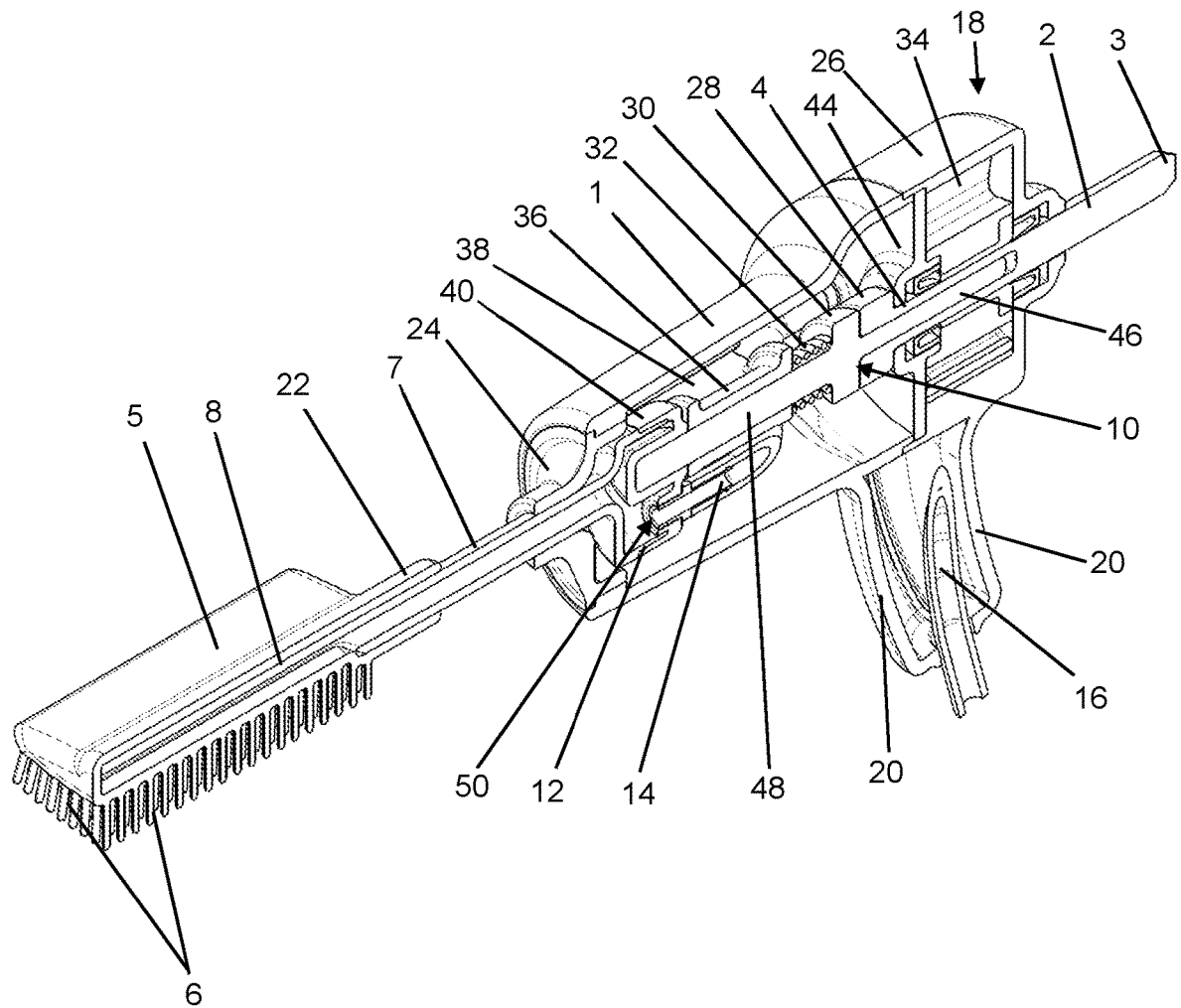
Figure 4:
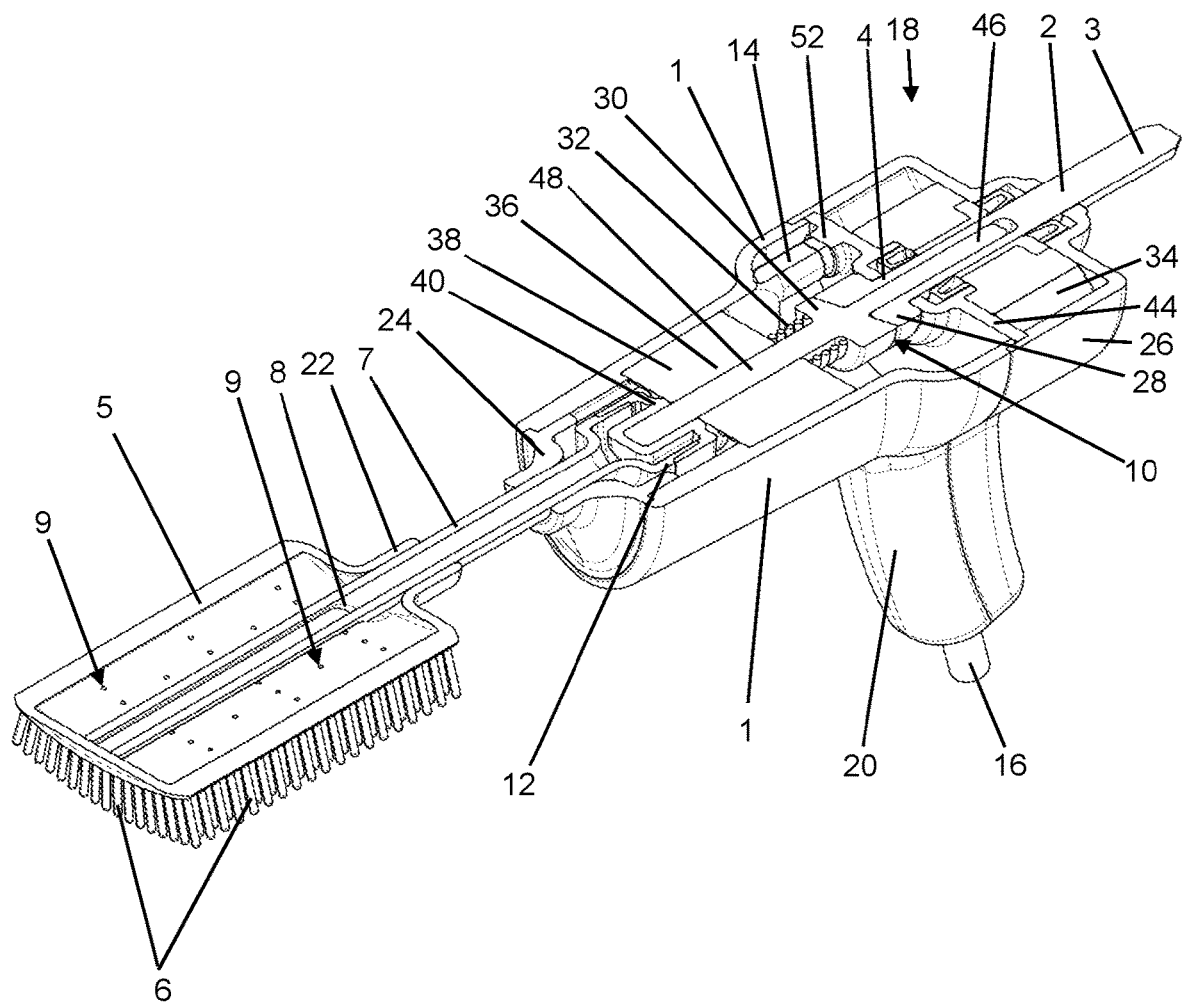
Figure 5:
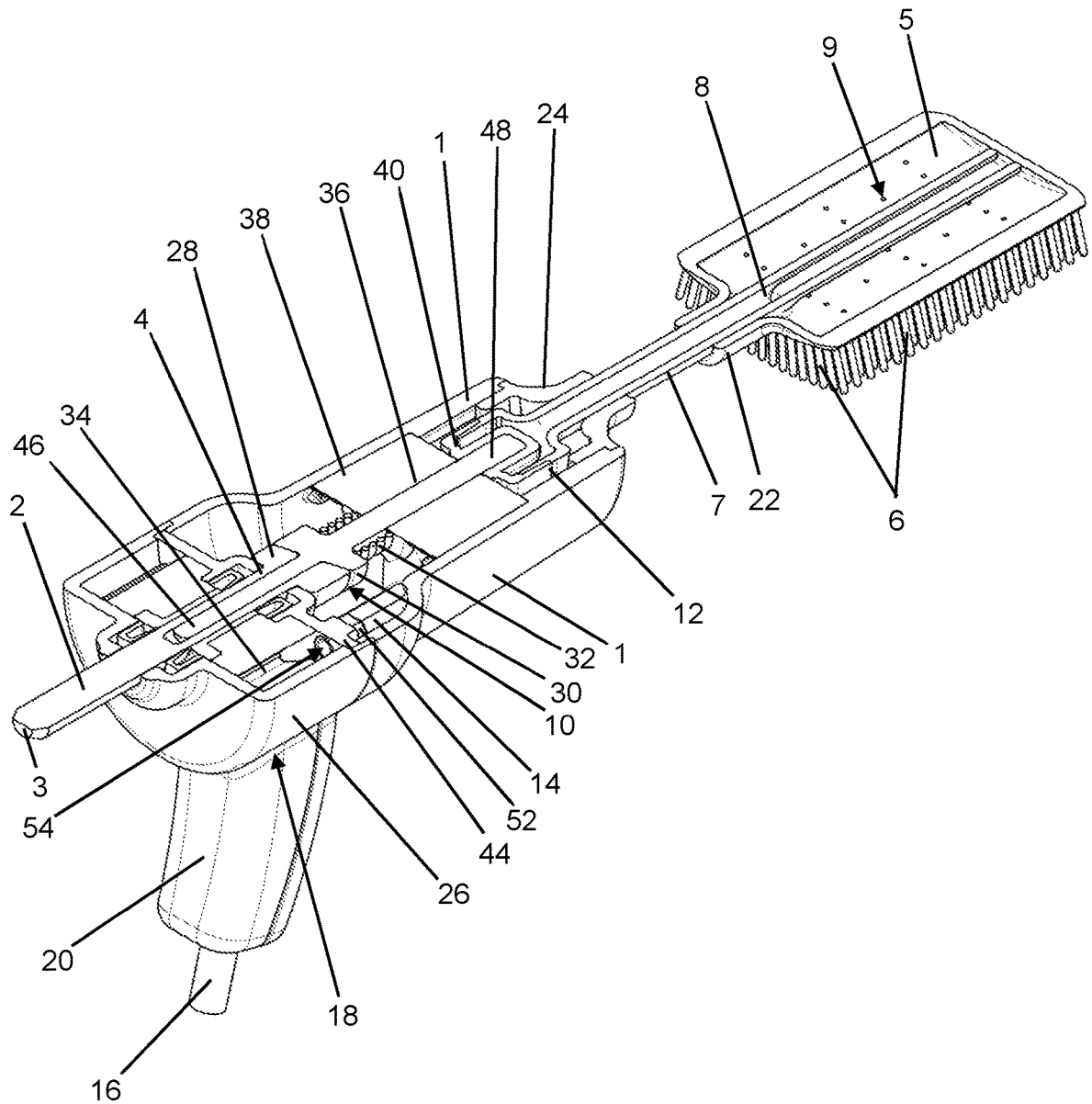

Further exemplary embodiments of the invention are explained below using seventeen schematically depicted Figures, but without thereby limiting the invention. Thereby shown are:

FIG. 1: a schematic perspective view of an exemplary first surgical cleaning device according to the invention;

FIG. 2: a schematic perspective partial sectional view of the first surgical cleaning device according to the invention according to FIG. 1 with a cross-section of the housing that is cut in the longitudinal direction and is open;

FIG. 3: a schematic perspective cross-sectional view in the longitudinal direction of the first surgical cleaning device according to the invention according to FIGS. 1 and 2 for illustrating the inner assembly;

FIG. 4: a schematic perspective cross-sectional view in the horizontal direction of the first surgical cleaning device according to the invention according to FIGS. 1 to 3 for illustrating the inner assembly;

FIG. 5: a further schematic perspective cross-sectional view in the horizontal direction of the first surgical cleaning device according to the invention according to FIGS. 1 to 4 from an angle of view opposite to FIG. 4

Figure 6:
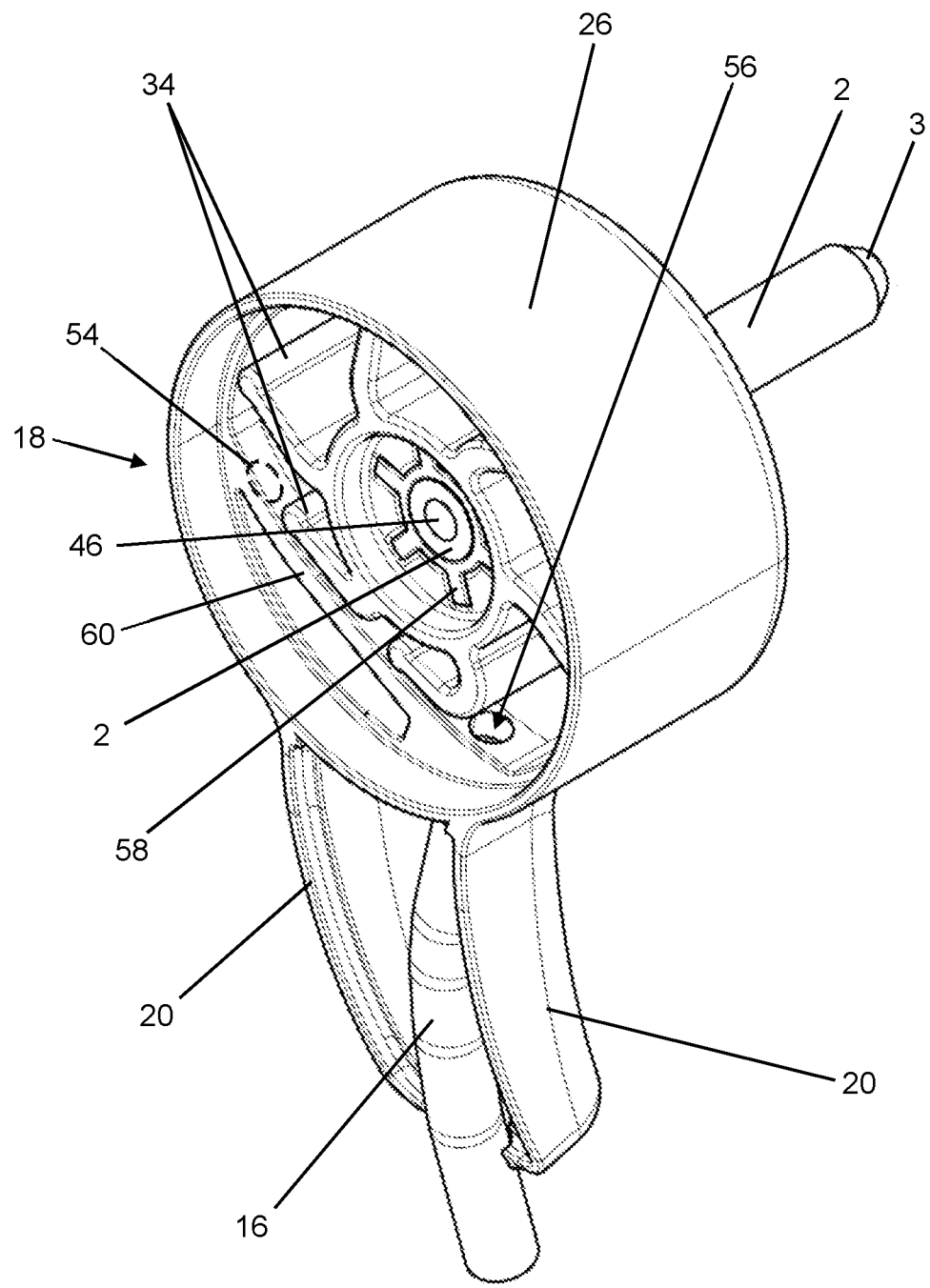
Figure 7:
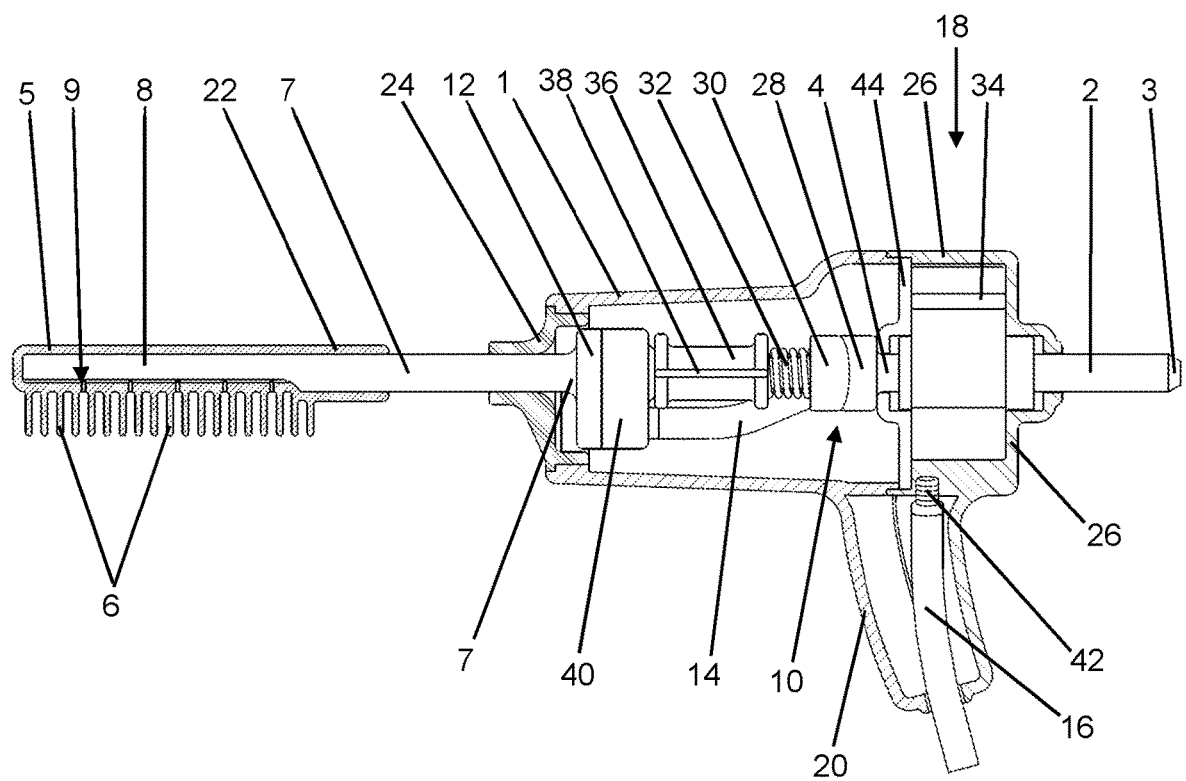
Figure 8:
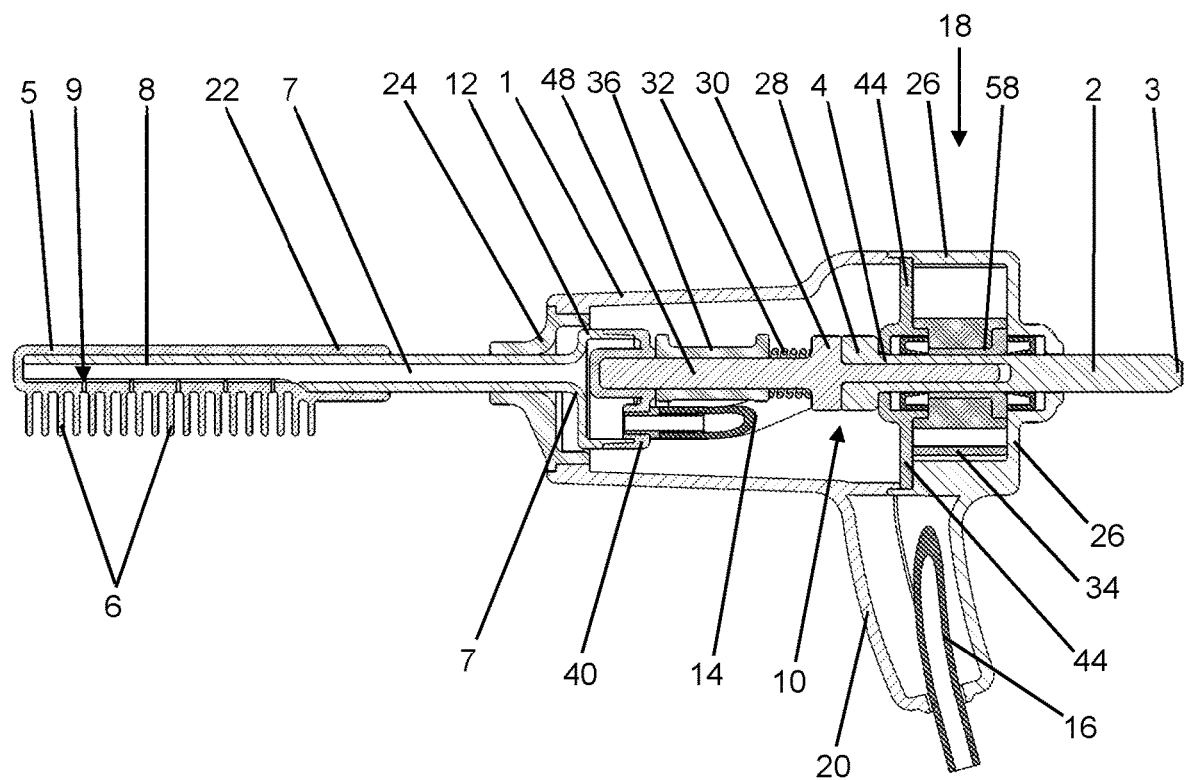
Figure 9:
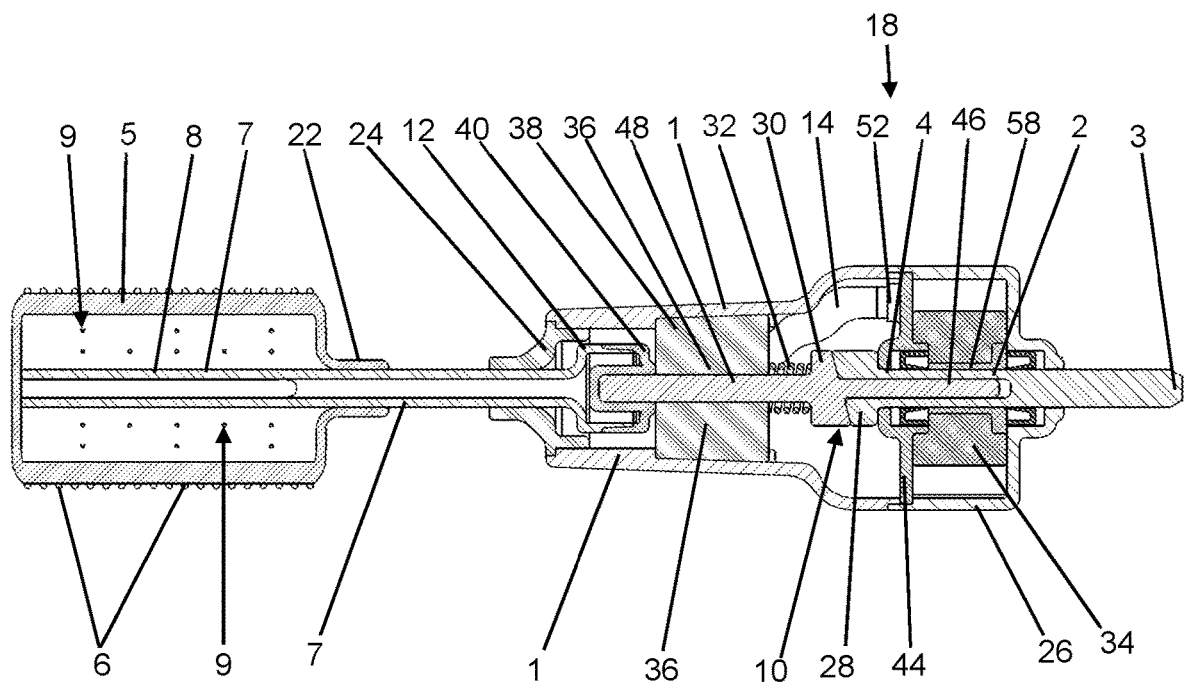
Figure 10:
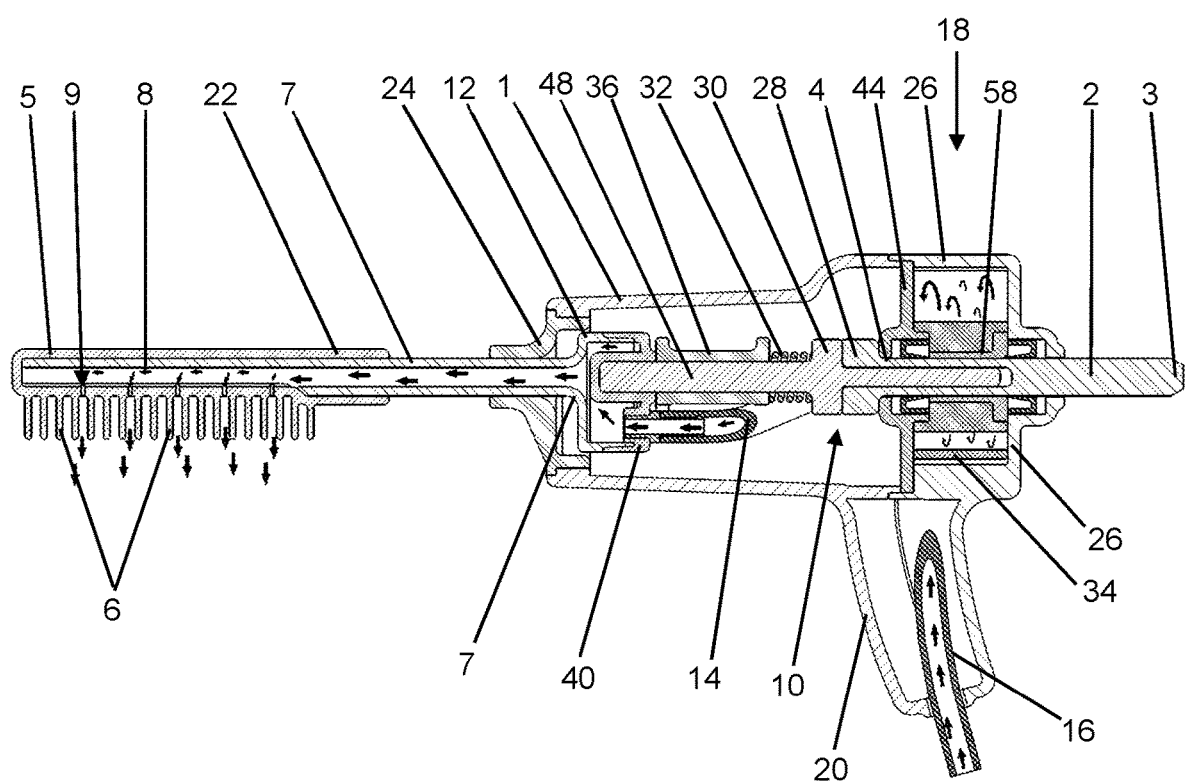
Figure 11:
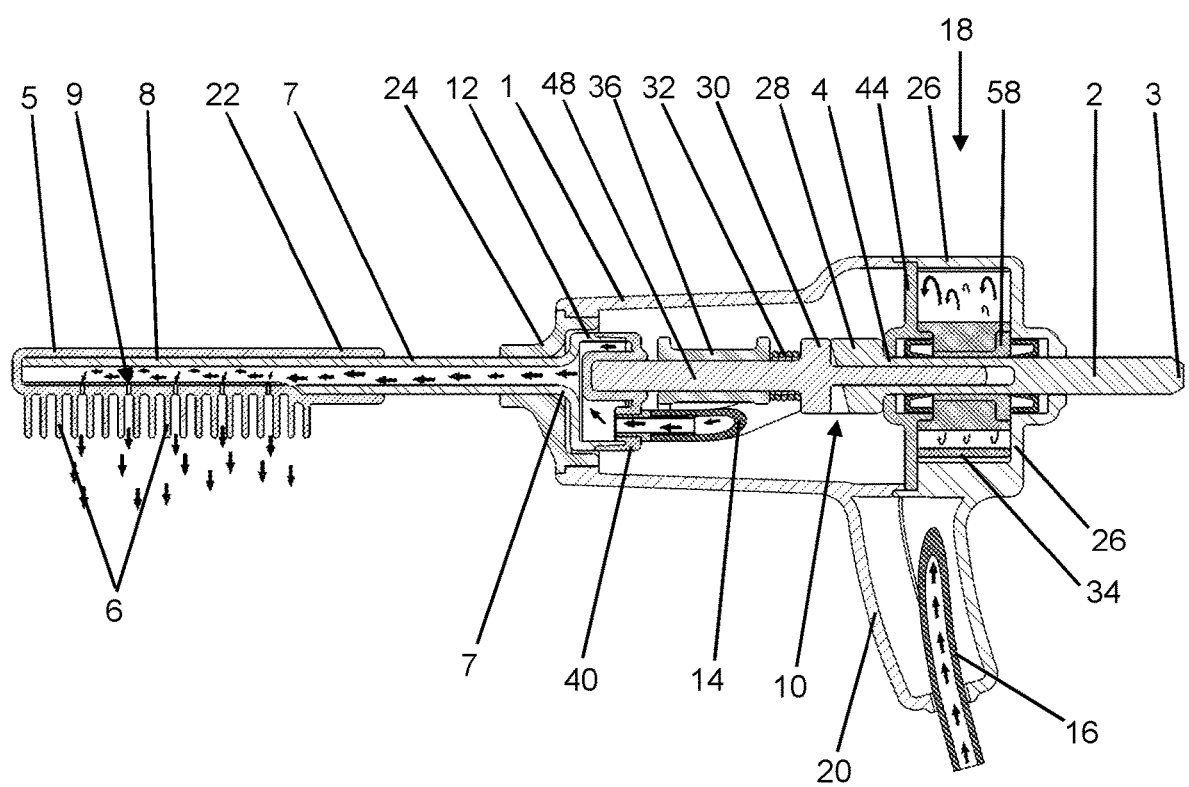
Figure 12:
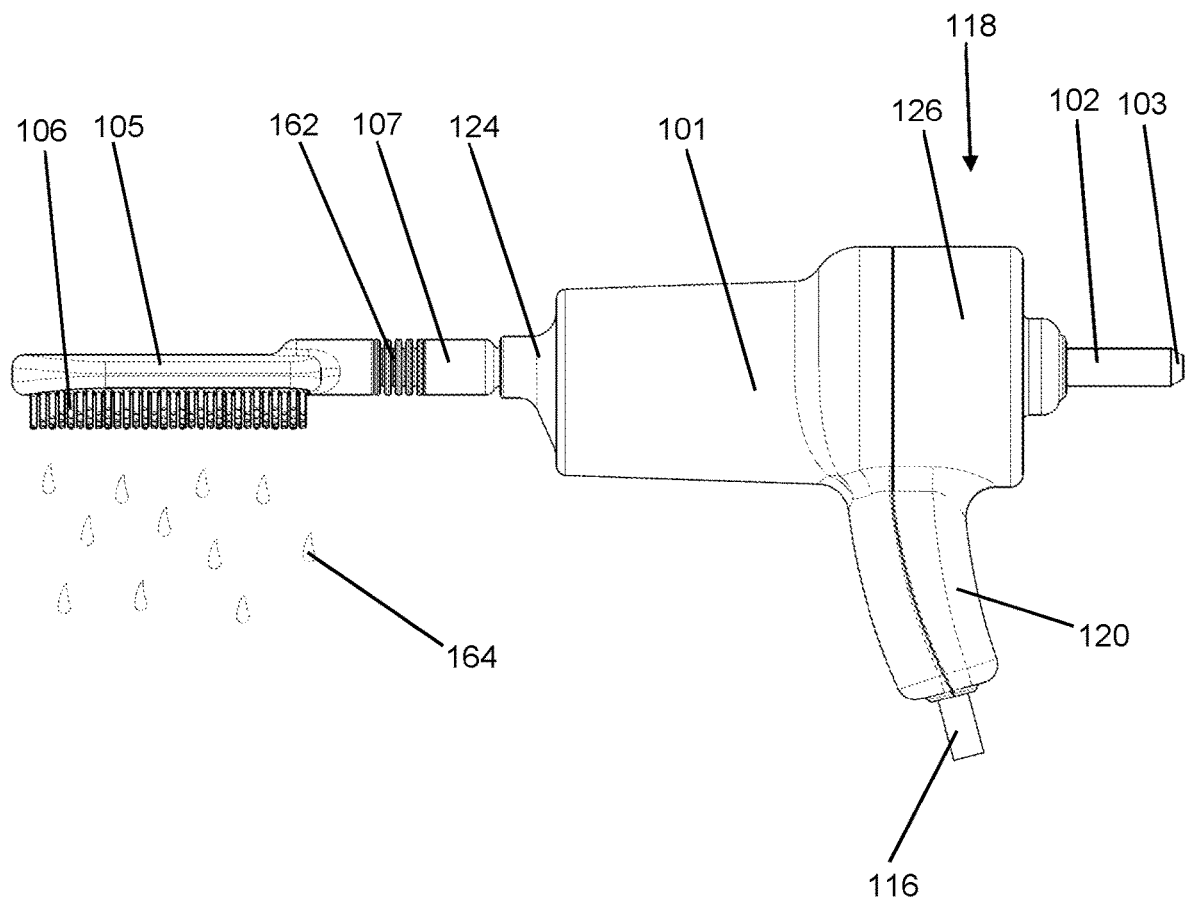
Figure 13:
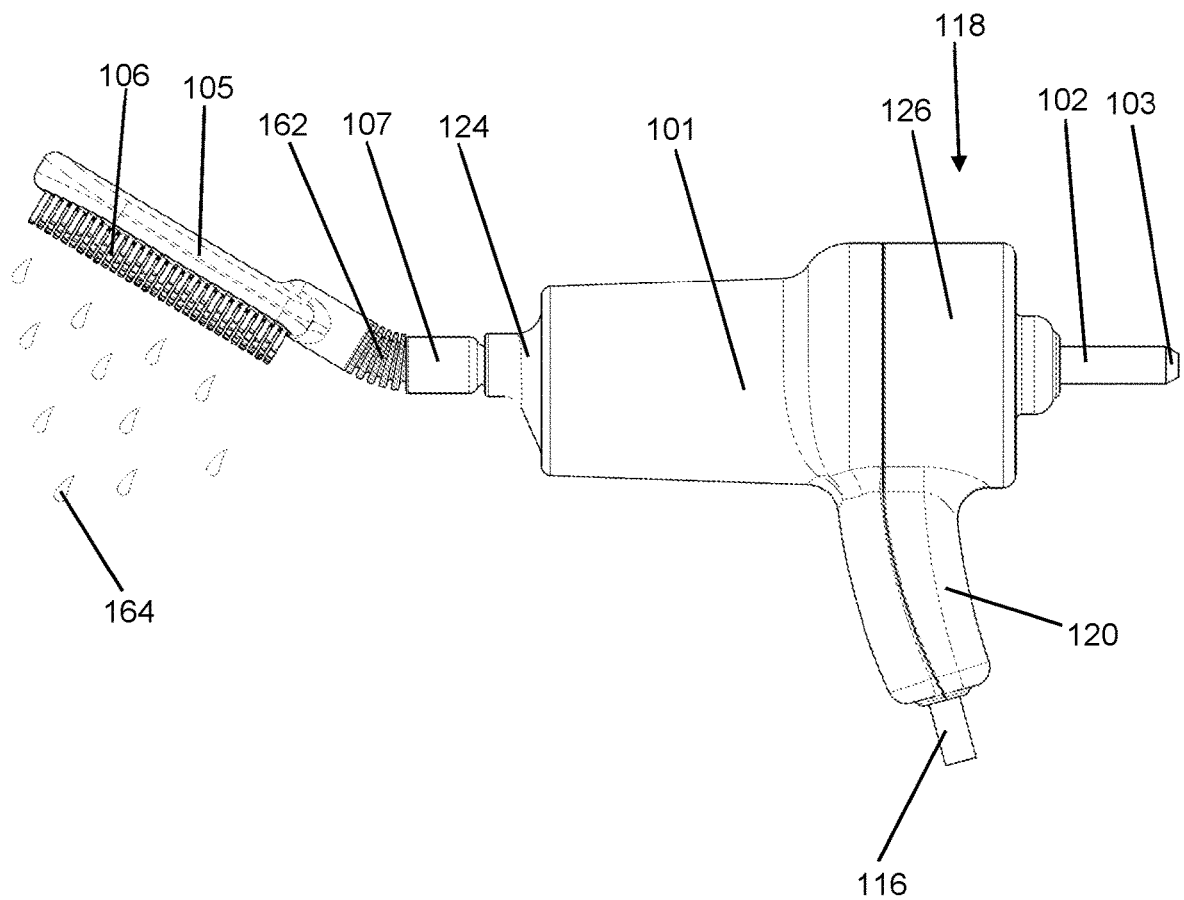
Figure 14:
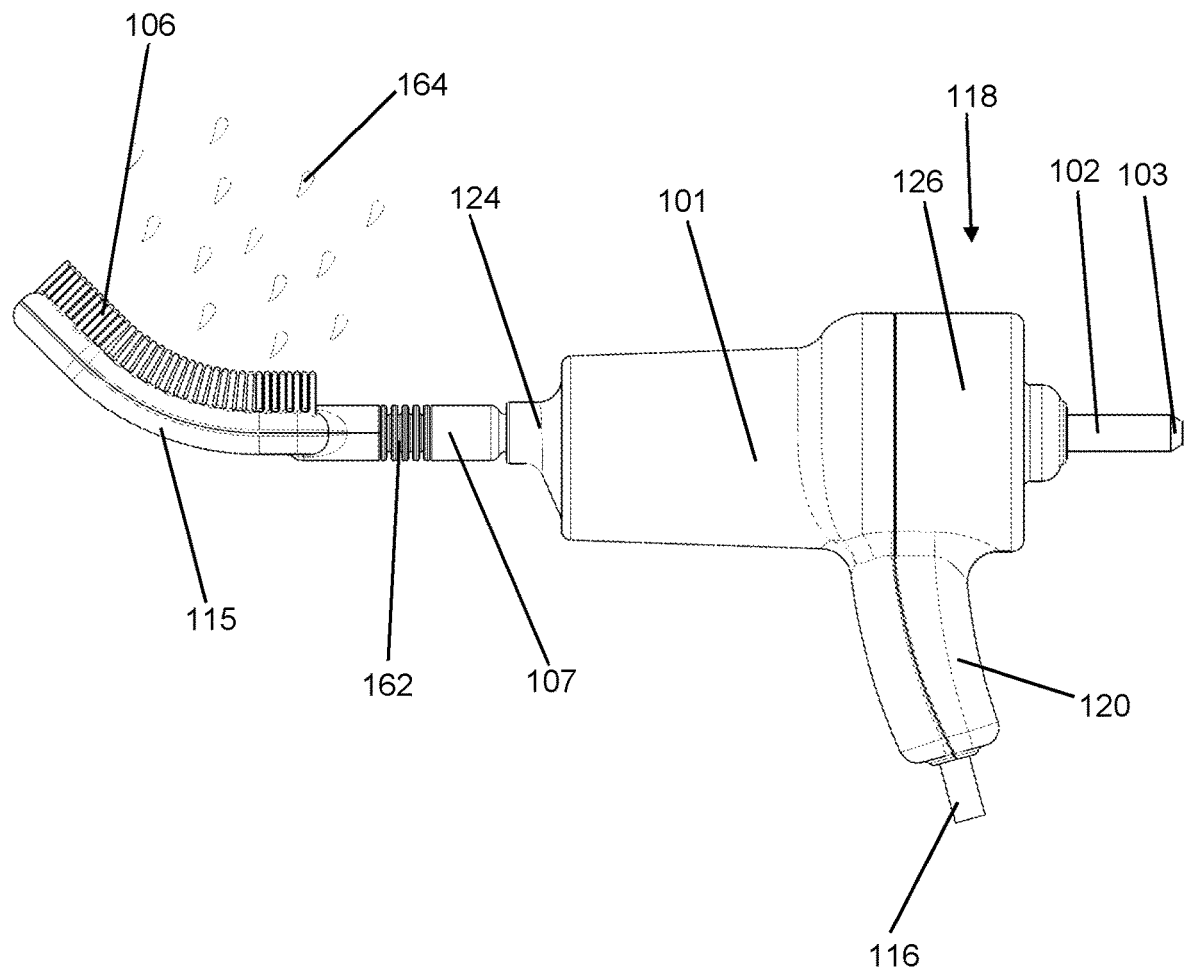
Figure 15:
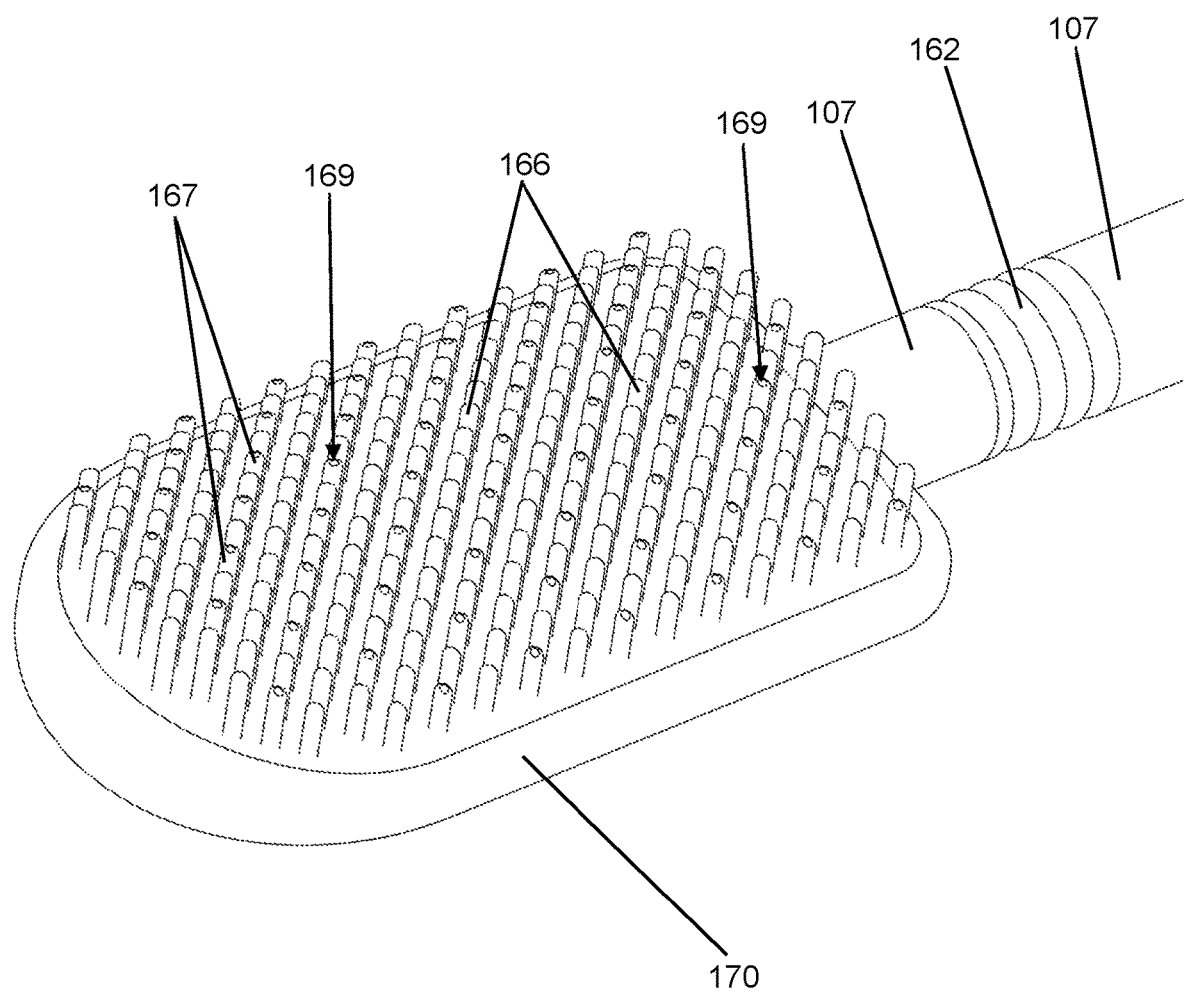
Figure 16:
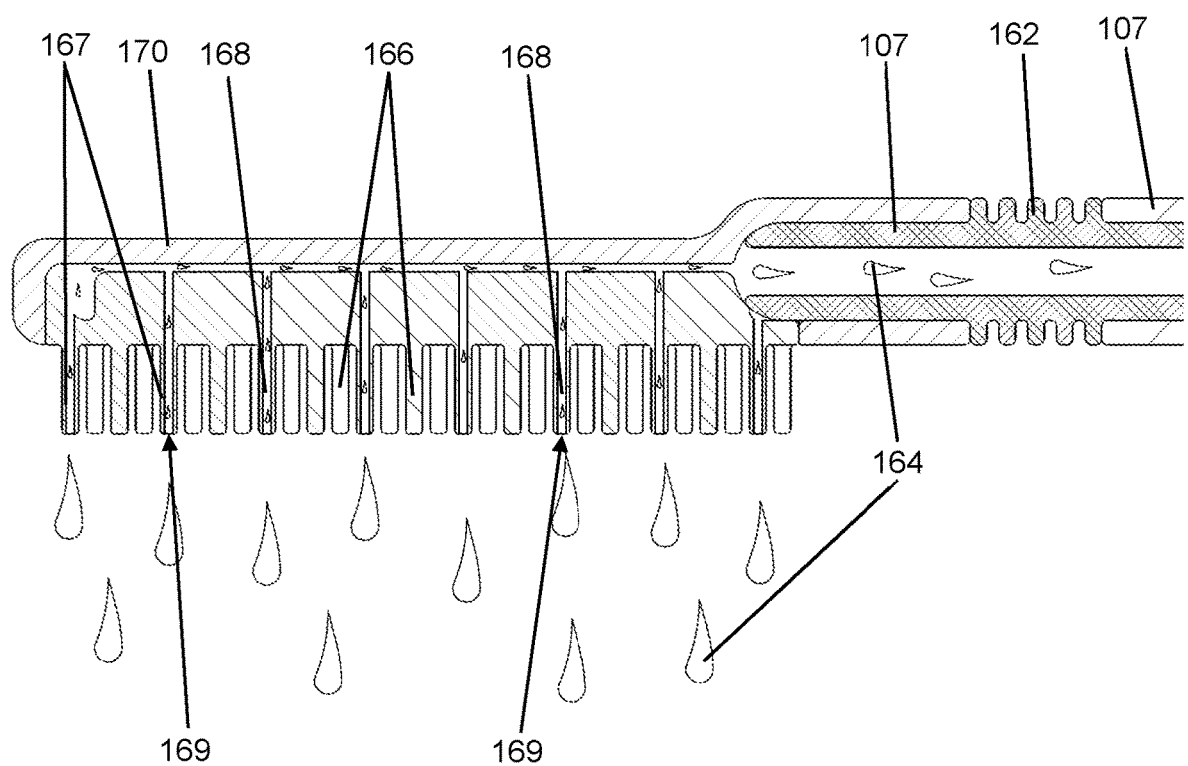
Figure 17:
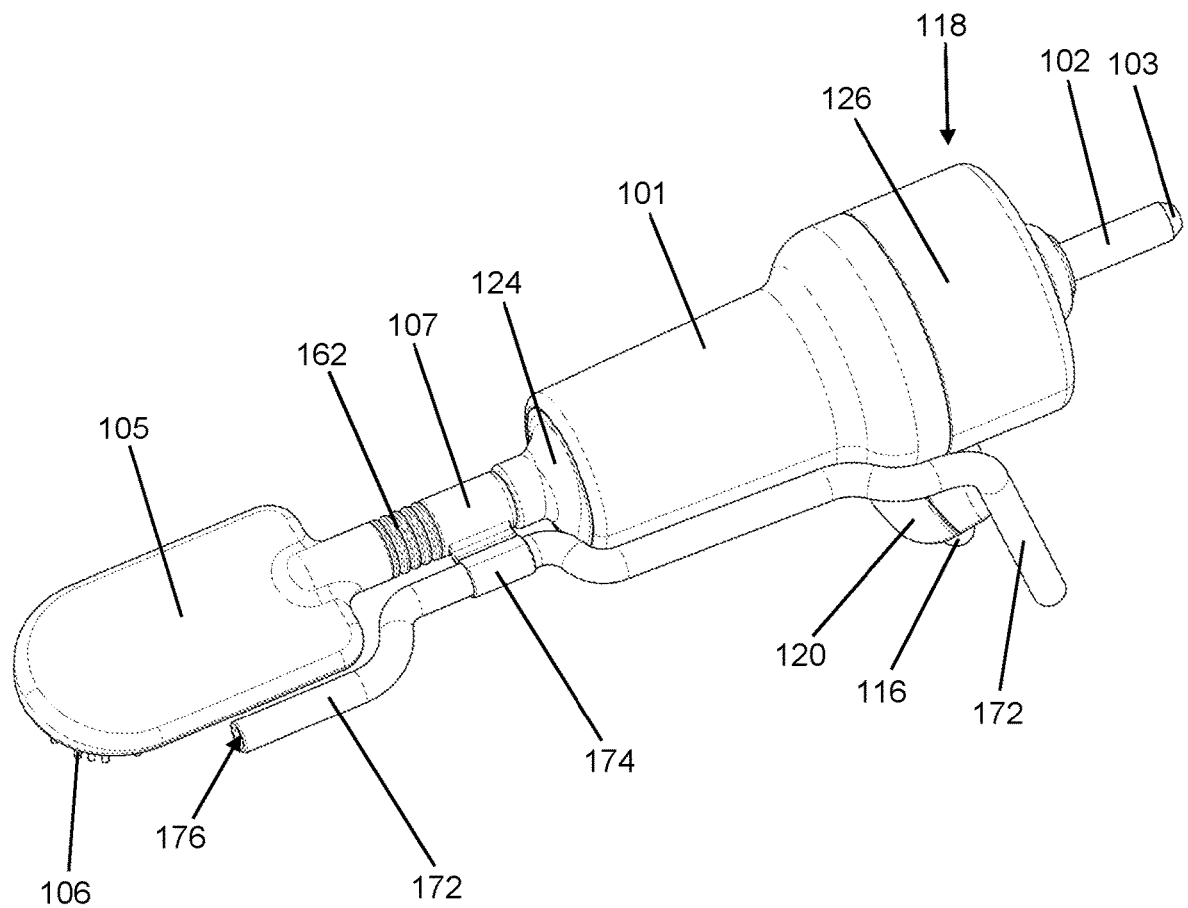
Figure 18:
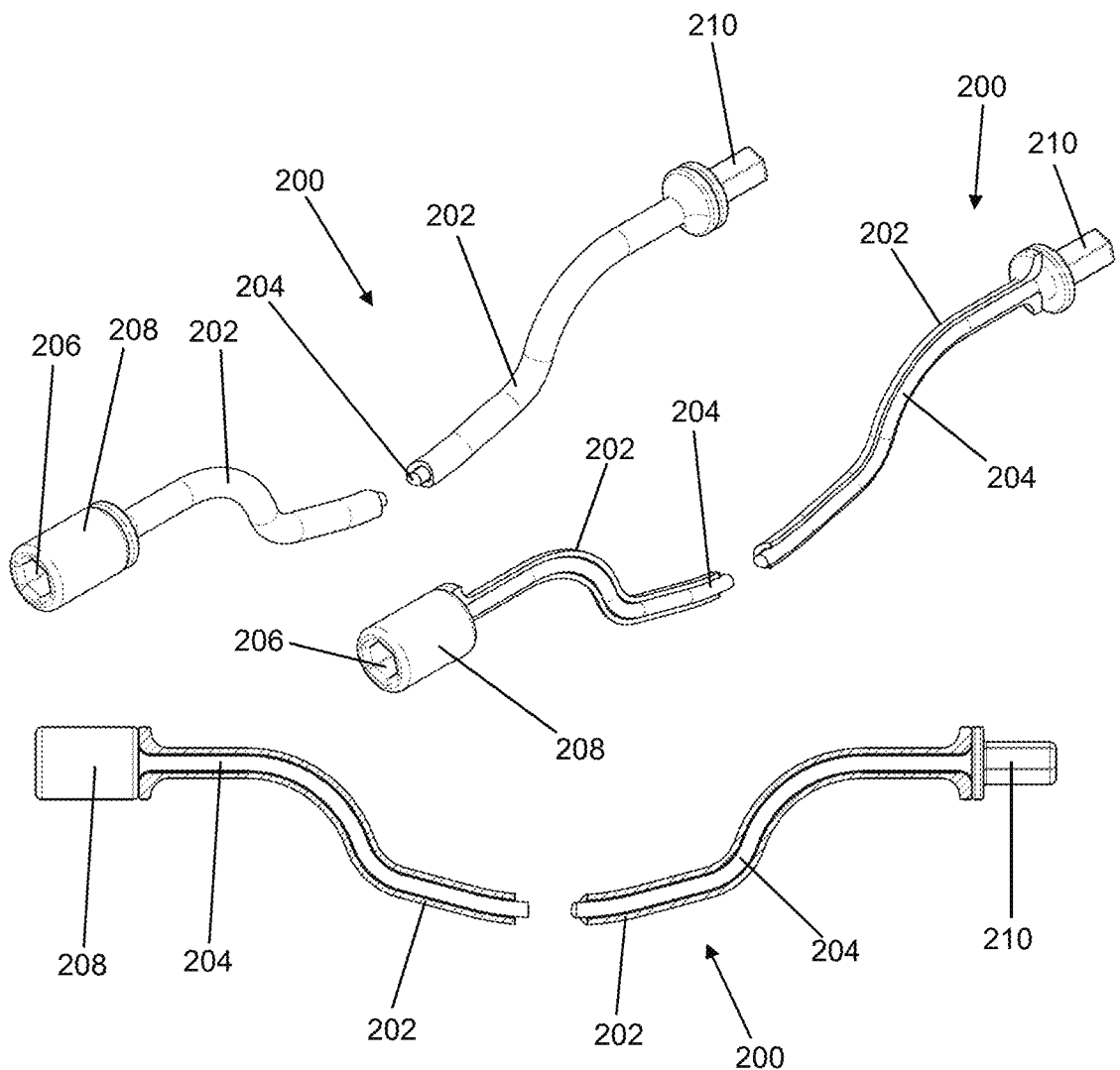

FIG. 6: a schematic partial section view of a pump of the first surgical cleaning device according to the invention;

FIG. 7: a schematic lateral partial cross-sectional view in the longitudinal direction of the first surgical cleaning device according to the invention according to FIGS. 1 to 6 with the housing open and the brush head open;

FIG. 8: a schematic lateral cross-sectional view in the longitudinal direction of the first surgical cleaning device according to the invention according to FIGS. 1 to 7;

FIG. 9: a schematic cross-sectional view of a section in the horizontal direction of the first surgical cleaning device according to the invention according to FIGS. 1 to 8;

FIG. 10: a schematic lateral cross-sectional view in the longitudinal direction of the first surgical cleaning device according to the invention according to FIGS. 1 to 9 during operation;

FIG. 11: a schematic lateral cross-sectional view in the longitudinal direction of the first surgical cleaning device according to the invention according to FIGS. 1 to 10 during operation with a brush head deflected at the front (left);

FIG. 12: a schematic perspective side view of a second surgical cleaning device according to the invention with a bendable tube;

FIG. 13: a schematic perspective side view of the second surgical cleaning device according to the invention according to FIG. 12 with a kinked bendable tube;

FIG. 14: a schematic perspective side view of a third surgical cleaning device according to the invention with a curved brush head;

FIG. 15: a schematic perspective view of a brush head for a fourth surgical cleaning device according to the invention with hollow bristle FIG. 16: a schematic cross-sectional view of the brush head for the fourth surgical cleaning device according to the invention according to FIG. 15;

FIG. 17: a schematic perspective view of a fifth surgical cleaning device according to the invention with a suction device; and FIG. 18: a schematic perspective view (top left), a schematic perspective cross-sectional view (center) and a schematic cross-sectional view (bottom right) on a drive shaft extension for a surgical cleaning device according to the invention.

In the figures and in the following description for the exemplary embodiments of the present invention explained with reference to the figures, the same reference signs are used in part for different embodiments and for different individual parts, in order to simplify the comparability of the exemplary embodiments and the readability.

FIG. 1 shows a perspective exterior view of an exemplary first surgical cleaning device according to the invention. FIGS. 2 to 11 show further views, cross-sectional views and detail views of the first surgical cleaning device and its parts, wherein FIGS. 10 and 11 show the operation of the first surgical cleaning device according to the invention as cross-sectional views. The first surgical cleaning device has a housing 1 which closes the surgical cleaning device in parts to the outside and can be used in a rear region as a handle 20 for holding the surgical cleaning device.

Located in the interior of the housing 1 is a drive shaft 2 which is mounted rotatable therein. The drive shaft 2 has a rear end 3, which is directly connected, or can be connected, via a drive shaft to extension 200 (see FIG. 17) or to an external drive unit (not shown). The external drive unit can be, for example, a multi-purpose drive that is conventional in the operating theater, or a drill or similar. Opposite the rear end 3, the drive shaft 2 has a front end 4. A brush head 5 is positioned on the front side of the surgical cleaning device, wherein a large number of elastically deformable bristles 6 can be attached to the brush head 5.

The brush head 5 is attached to a front end 8 of a tube 7. The tube 7 can also serve to introduce rinsing liquid into the brush head 5. The brush head 5 can be shaped as a hollow body or can contain lines for conducting the rinsing liquid in its interior. A plurality of ejection openings 9, which can be connected to the tube 7 in a liquid-conducting manner, can be provided on an underside of the brush head 5. For this purpose, the ejection openings 9 can connect the surroundings of the brush head 5 to an interior of the brush head 5, wherein the interior of the hollow body or of the brush head 5 is connected to the tube 7 in a liquid-conducting manner. The tube 7 preferably opens into the interior of the hollow body or of the brush head 5. In the region of the elastic deformable bristles 6, the ejection openings 9 open into their effective region, that is to say into the region which the elastically deformable bristles 6 sweep during a linearly oscillating movement of the brush head 5.

Arranged between the tube 7 and the drive shaft 2 is a gearbox 10 which translates a rotation of the drive shaft 2 into a linear oscillating movement of the tube 7 with the brush head 5. For this purpose, the gearbox 10 can act on a rear end 12 of the tube 7. The rear end 12 of the tube 7 can be connected via a cap 40 to a first liquid line 14. For this purpose, the first liquid line 14 can open into the tube 7 Via an opening 50 in the cap 40. Rinsing liquid can be fed into the tube 7 through the first liquid line 14. The rinsing liquid can then flow through the tube 7 and through the brush head 5 to the ejection openings 9 and be injected from there into the operating region of the bristles 6. The first liquid line 14 can be a flexible hose which is connected on one side to the closure cap 40 at the rear end 12 of the tube 7 and on the other side to the housing 1. The hose can compensate for the linear oscillating movement of the tube 7 against the housing 1 by deformation of the tube during the movement of the tube 7.

The drive shaft 2 can be formed at the rear end 3 as a connection in the form of a hexagon or another multi-arm rod. A chuck or an appropriate mating connection of the external drive device can be connected to the rear end 3 or the connection. A drive shaft extension 200 (see FIG. 18) can be connected between the rear end 3 or the connection and the mating connection of the external drive device.

The surgical cleaning device can have a pump 18 which can be connected to the drive shaft 2 in the region of the rear end 3 of the drive shaft 2. The pump 18 can be driven via the drive shaft 2 and can be connected to the drive shaft 2 for this purpose. The pump 18 can preferably be designed as an impeller pump and is shown in detail in FIG. 6. The pump 18 is connected to a second liquid line 16 for supplying a liquid to the pump 18 and to the first liquid line 14 for discharging the liquid from the pump 18 into the tube 7. Instead of the impeller pump, another pump can also be used. The impeller pump, however, is particularly preferred due to its simple design and due to the fact that the impeller pump physically separates the second liquid line 16 from the first liquid line 14 when the impeller pump is at a standstill.

The housing 1 can be formed on its underside as a handle 20. The handle 20 can be designed for simple handling of the surgical cleaning device in the manner of a pistol grip. The brush head 5 can have a tubular connecting piece 22, by means of which the brush head 5 can be plugged in a liquid-tight manner onto the tube 7 and fastened there. As a result, it can be possible to easily replace the brush head 5 if necessary. The housing 1 can be closed on its front side by a front closure 24. This facilitates the assembly of the surgical cleaning apparatus. The front closure 24 can be used for the linearly movable mounting of the tube 7 against the housing 1.

The pump 18 can have a pump housing 26 made of plastic. The pump housing 26 can form a part of the housing 1 on the outside. The drive shaft 2 can be guided by means of seals in a sealed manner through the pump housing 26 and be mounted by the pump housing 26.

A connection for connecting the second liquid line 16 to a supply line from a liquid source (not shown) can be formed on the pump housing 26. The pump housing 26 can be closed on its front side with a front plate 44. The drive shaft 2 can be guided into the pump 18 Via a mounting. A plurality of impeller blades 34 of the pump 18 can be attached to the drive shaft 2. The impeller blades 34 can be attached to the drive shaft 2 Via a receptacle 58. The impeller blades 34 can be elastically deformable perpendicular to the radial direction and rest on the inside of the pump housing 26. Due to the rotation and a wall 60 projecting into the pump space of the pump 18, the pump 18 then generates a pumping effect during the rotation of the impeller blades 34.

An impeller with a plurality of impeller blades 34 can thus be arranged In the pump 18. The impeller can be attached to the drive shaft 2 and rotate with the drive shaft 2. For this purpose, the receptacle 58 can be attached to the drive shaft 2, which is connected to the impeller in a force-fitting manner. By rotating the impeller with the drive shaft 2, the pump 18 can then be operated. In this way, the pumping of a rinsing liquid with the pump 18 takes place simultaneously with the linear oscillation of the elastically deformable bristles 6 and thus the ejection of a liquid jet of the rinsing liquid into the effective region of the elastically deformable bristles 6 (see the arrows in FIGS. 10 and 11).

The gearbox 10 can have a first plate 28 in the form of a wedge plate and can have a second plate 30 in the form of a wedge plate. Like the second plate 30, the first plate 28 can have a surface inclined against the axis of rotation of the drive shaft 2 and against the linear movement direction of the tube 7, wherein the inclined surface of the first plate 28 rests against the inclined surface of the second plate 30. For this purpose, the second plate 30 can be pressed against the first plate 28 with a resetting element 32. The resetting element 32 can be, for example, a compression spring or a spiral spring.

The first plate 28 can be attached to the front end 4 of the drive shaft 2 so that the first plate 28 rotates with the drive shaft 2. The second plate 30 can be fixedly connected to the tube 7 via a front shaft 48. For this purpose, the front shaft 48 can be attached in a closure cap 40 to the rear end 12 of the tube 7. The closure cap 40 can close the tube 7 in a fluid-tight manner at the rear end 12.

The front shaft 48 can be mounted linearly movable but not rotatable against the housing 1 with the aid of a bearing 36. For this purpose, the bearing 36 can be firmly connected to the housing 1 via wings 38. In this way, it can be prevented that the front shaft 48 and the second plate 30 can rotate against the housing 1. By changing the inclination of the first plate 28 against the inclination of the second plate 30 during the rotation of the drive shaft 2, the rotation of the first plate 28 is translated with the gearbox 10 into an oscillating linear movement of the second plate 30 and the linear oscillating movement of the brush head 5 is thereby generated (see FIGS. 10 and 11). At the same time, the rotation of the drive shaft 2 for driving the pump 18 can be used. The resetting element 32 can be supported on the bearing 36 and on a front side of the second plate 30.

A rear shaft 46 can be arranged on the rear side of the second plate 30. The rear shaft 46 can be arranged sliding and linearly movable in a suitable depression of the drive shaft 2. As a result, the second plate 30 is aligned with the first plate 28.

In order to produce a pulsating current of the rinsing liquid, a diaphragm with at least one recess can be provided, which presses the first liquid line 14 together at least once during each rotation of the first plate 28. The diaphragm can have regions with radii of different sizes, so that, during a full rotation of the drive shaft 2, the ejection openings 9 or the first liquid line 14 are temporarily opened before they are temporarily closed. As a result, a pulsating discharge of the rinsing liquid is generated, which is clocked at the rotational speed of the drive shaft 2. At the same time with the drive of the linearly oscillating movement of the elastically deformable bristles 6 and the ejection of the rinsing liquid, a pulsating operation of the liquid flow of the rinsing liquid can also be generated via the rotation of the drive shaft 2.

The first liquid line 14 can be connected to the pump 18 on the side opposite the locking cap 40 via a connection 52 for the first liquid line 14 to the pump 18. With the pump 18, the rinsing liquid can be pressed or pumped through an opening 54 into the first liquid line 14.

In the region of an opening 56 for the rinsing liquid into the pump 18 (see FIG. 6) an internal thread for attaching an external thread 42 of the second liquid line 16 can be arranged for connecting the second liquid line 16. The pump 18 can be connected via the second liquid line 16 to a rinsing liquid reservoir (not shown) of the rinsing liquid. The surgical cleaning device can be operated by connecting the surgical cleaning device to the rear end 3 of the drive shaft 2 directly or via a drive shaft extension 200 to the external drive unit. The external drive unit drives the drive shaft 2. By rotating the drive shaft 2, the pump 18 can be operated and at the same time the brush head 5 constructed with the elastically deformable bristles 6 can be moved linearly oscillating. The pump 18 generates a flow of the rinsing liquid, which is ejected via the ejection openings 9 in the direction of the elastically deformable bristles 6. By means of the diaphragm, a pulsating flow of the rinsing liquid can be produced. With the surgical cleaning device, mechanical cleaning with simultaneous action of the liquid jet of the rinsing liquid can thus take place.

The entire surgical cleaning device can be made of plastic and can be burned without residue after use. However, it is also not very many of the individual smaller parts, such as, for example, the resetting element 32 are manufactured from another material, such as steel, for example.

FIGS. 12 and 13 show a schematic side view of an exemplary second surgical cleaning device according to the invention. The surgical cleaning device can have a housing 101 which closes the surgical cleaning device largely externally and can be shaped in a rear region as a handle 120 for holding the surgical cleaning device. The inner structure of the second surgical cleaning device according to FIGS. 12 and 13 resembles that of the first exemplary embodiment.

Located inside the housing 101 is a drive shaft 102 rotatably mounted therein. The drive shaft 102 has a rear end 103, the rear end 103 is connected, or can be connected, directly or via a drive shaft extension 200 (see FIG. 18) to an external drive unit (not shown). The external drive unit can be, for example, a multi-purpose drive that is conventional in the operating theater, or a drill or similar.

A brush head 105 is arranged on the front side of the second surgical cleaning device, a plurality of elastically deformable bristles 106 being able to be attached to the brush head 105.

The brush head 105 is attached to a front end of a tube 107. The tube 107 can also serve to introduce rinsing liquid 164 into the brush head 105. The brush head 105 can be shaped as a hollow body. A plurality of ejection openings can be provided on an underside of the brush head 105, which can be connected to the tube 107 in a liquid-conducting manner. For this purpose, the ejection openings can connect the surroundings of the brush head 105 to an interior of the brush head 105, wherein the interior of the hollow body or of the brush head 105 is connected to the tube 107 in a liquid-conducting manner. The tube 107 preferably opens into the interior of the hollow body or of the brush head 105. The ejection openings open in the region of the elastic deformable bristles 106 in their operative area, that is to say into the region which the elastically deformable bristles 106 sweep during a linearly oscillating movement of the brush head 105.

In contrast to the first exemplary embodiment, the tube 107 has a flexibly bendable tube section 162, by means of which the angle of the brush head 105 against the housing 101 can be inclined by up to 45°. As a result, regions with the brush head 105 that are otherwise difficult to access can be reached.

Between the tube 107 and the drive shaft 102, a gearbox (not visible) is arranged within the housing 101, which translates a rotation of the drive shaft 102 into a linear oscillating movement of the tube 107 with the brush head 105. For this purpose, the gearbox can act on a rear end of the tube 107. The rinsing liquid 164 can then flow through the tube 107 and through the brush head 105 to the ejection openings and be injected from there into the operating area of the bristles 106. The tube 107 can be connected to a pump 118 Via a first liquid line (not visible) in the form of a tube. The hose can compensate for the linear oscillating movement of the tube 107 against the housing 101 by deformation of the tube during the movement of the tube 107.

The drive shaft 102 can be formed at the rear end 103 as a connection in the form of a hexagon or another multi-arm rod. A chuck or an appropriate mating connection of the external drive device can be connected to the rear end 103 or the connection. A drive shaft extension 200 (see FIG. 18) can be connected between the rear end 103 or the connection and the mating connection of the external drive device.

The surgical cleaning device may have a pump 118 that may be connected to the drive shaft 102 in the region of the rear end 103 of the drive shaft 102. The pump 118 can be driven via the drive shaft 102 and can be connected to the drive shaft 102 for this purpose. The pump 118 can preferably be designed as an impeller pump (analogous to FIG. 6). The pump 118 is connected to a second liquid line 116 for supplying a liquid to the pump 118 and to the first liquid line for discharging the rinsing liquid 164 from the pump 118 into the tube 107. Instead of the impeller pump, another pump can also be used. The impeller pump, however, is particularly preferred due to its simple design and due to the fact that the impeller pump physically separates the second liquid line 116 from the first liquid line when the impeller pump is at a standstill.

The housing 101 can be formed on its underside as a handle 120. The handle 120 can be designed for simple handling of the surgical cleaning device in the manner of a pistol grip. The housing 101 can be closed on its front side with a front fastener 124. This simplifies the assembly of the surgical cleaning apparatus. The front fastener 124 can be used for linearly movable mounting of the tube 107 against the housing 101.

The pump 118 can have a pump housing 126 made of plastic. The pump housing 126 can form a part of the housing 101 on the outside. The drive shaft 102 can be guided by means of seals in a sealed manner through the pump housing 126 and be mounted by the pump housing 126.

A connection for connecting the second liquid line 116 to a supply line from a liquid source (not shown) can be formed on the pump housing 126. The pump housing 126 can be separated on its front side with a front plate from the rest of the interior of the housing 101. The drive shaft 102 can be guided into the pump 118 by a bearing.

By rotating the drive shaft 102, the pump 118 can then be operated. In this way, the pumping of a rinsing fluid 164 with the pump 118, and thus the ejection of a liquid jet of the rinsing liquid 164, takes place simultaneously with the linear oscillation of the elastically deformable bristles 106 into the operative area of the elastically deformable bristles 106.

With the gearbox (not shown) in the housing 101, the rotation of the drive shaft 102 is translated into an oscillating linear movement of the tube 107 and the brush head 105. At the same time, rotation of the drive shaft 102 can be used to drive the pump 118. The drive shaft 102 is rotatably mounted in the housing 101 for this purpose and the tube 107 is not rotatable and linear (axially relative to the tube 107) movable mounted against the housing 101.

The pump 118 can be connected via the second liquid line 116 to a rinsing liquid reservoir (not shown) of the rinsing liquid 164. The second surgical cleaning device may be operated by connecting to the external drive unit with the rear end 103 of the drive shaft 102 directly or via a drive shaft extension 200. The external drive unit drives the drive shaft 102. By rotating the drive shaft 102, the pump 118 can be operated and at the same time the brush head 105 constructed with the elastically deformable bristles 106 can be moved linearly oscillating. The pump 118 generates a flow of the rinsing liquid 164, which is ejected via the ejection openings in the direction of the elastically deformable bristles 106. With the surgical cleaning device, mechanical cleaning can thus take place with simultaneous action of the liquid jet of the rinsing liquid 164.

The entire second surgical cleaning device can be made of plastic and can be burned without residue after use. However, it doesn't matter if individual smaller parts are made of another material.

FIG. 14 shows a schematic perspective side view of a third surgical cleaning device according to the invention with a curved brush head 115. Except for the curved brush head 115, which enables a better application of the surgical cleaning device at locations that are difficult to access, the design of the third surgical cleaning device according to the invention is similar to that of the second surgical cleaning device according to the invention according to FIGS. 12 and 13 and in the interior of the construction of the first surgical cleaning device according to the invention according to FIGS. 1 to 11.

FIG. 15 shows a schematic perspective view of a brush head 170 for a fourth surgical cleaning device according to the invention with massive elastically deformable bristles 166 and with hollow elastically deformable bristles 167. FIG. 16 shows a schematic cross-sectional view of the brush head 170 for the fourth surgical cleaning device according to the invention. The hollow elastically deformable bristles 167 are connected to the cavity of the brush head 170 and thus to a tube 107. In the interior of the hollow elastically deformable bristles 167, lines 168 are provided, by means of which the rinsing liquid 164 can be guided to the ejection openings 169 to the ends of the hollow elastically deformable bristles 167 facing away from the brush head 170. As a result, the location of the mechanical cleaning by the elastically deformable bristles 166, 167 and the location of the action of the washing liquid 164 can be combined even better and the cleaning effect can thereby be improved.

Otherwise, the structure of the fourth surgical cleaning device according to the invention is the same as the second surgical cleaning device according to the invention according to FIGS. 12 and 13 and in the interior of the construction of the first surgical cleaning device according to the invention according to FIGS. 1 to 11.

FIG. 17 shows a schematic perspective view of a fifth surgical cleaning device according to the invention with an suction device. The fifth surgical cleaning device according to FIG. 17 is constructed in the same way as the second surgical cleaning device according to FIGS. 12 and 13, wherein a suction line 172 with a holder 174 is additionally attached to the tube 107. The suction line 172 ends at an suction opening 176 which is arranged in the region of the brush head 105. Preferably, the suction opening 176 is funnel-shaped. Used washing liquid 164 can thus be sucked out of the region of the brush head 105. For this purpose, the suction line 172 can be connected to an external suction pump.

The suction line 172 can be connected or is connectible to a vacuum source (not shown) and serves to remove the used washing liquid 164. Such negative pressure sources are usually available in hospitals. A separator (not shown) for separating solid components from the extracted used washing liquid 164 can be positioned between the negative pressure source and the suction line 172.

The suction device according to FIG. 17 can also be used with the first or the third or the fourth exemplary surgical cleaning device.

FIG. 18 shows a schematic perspective exterior view (top), a schematic perspective partial sectional view (center), and a schematic cross-sectional view (bottom) of a drive shaft extension 200, which may be part of a surgical cleaning device according to the invention, or via which a surgical cleaning device according to the invention can be driven by the connection the drive shaft extension 200 establishes between the rear end 3, 103 of the drive shaft 2, 102 with the external drive device.

The drive shaft extension 200 can have a movable hose 202 in which a movable shaft 204, such as a cable, can be positioned. The movable tube 202 and the movable shaft 204 therein may preferably be bent and/or curved in the manner of a tube. For connection to the rear end 3, 103 of the drive shaft 2, 102, a fitting edge hole 206 can be provided, into which the rear end 3, 103 of the drive shaft 2, 102 can be inserted in a form-fitting manner. A magnetic coupling can also be provided. The edge hole 206 may be part of a connector socket 208 that is rigidly connected to an end of the movable shaft 204 in the tube 202. At the other end of the movable shaft 204, an extension terminal 210 may be rigidly connected to the movable shaft 204. The extension connection 210 can be connected or is connectible to an external drive unit and can be designed for this purpose as a hexagon.

The surgical cleaning devices can be manufactured completely from plastic with and without an suction device. As a result, after use, the surgical cleaning devices according to the invention can be disposed of together with other waste from the operating area and be completely burnt in a hygienic manner. At the same time, the surgical cleaning devices according to the invention can be disinfected in a simple manner with the aid of ethylene oxide or with Gamma rays prior to use.

The features of the invention disclosed in the preceding description, as well as the claims, Figures, and exemplary embodiments, may be essential both individually and in any combination for realizing the invention in its various embodiments.

LIST OF REFERENCE CHARACTERS 1, 101 Housing
2, 102 Drive shaft
3, 103 Rear end of the drive shaft
4 Front end of the drive shaft
5, 105, 115 Brush head
6, 106, 166 Elastically deformable bristles
7, 107 Tube
8 Front end of the tube
9, 169 Ejection opening
10 Gearbox
12 Rear end of the tube
14 First liquid line
16, 116 Second liquid line
18, 118 Pump
20, 120 Handle
22 Connecting piece
24, 124 Front closing
26, 126 Pump housing
28 First plate
30 Second plate
32 Resetting element
34 Impeller blade
36 Bearing
38 Blade
40 Closure cap
42 Thread
44 Front plate
46 Rear shaft
48 Front shaft
50 Opening into the tube
52 Connection for the first liquid line to the pump
54 Opening into the first liquid line
56 Opening into the pump
58 Mounting
60 Wall
162 Flexibly bendable tube section
164 Rinsing liquid
167 Hollow elastically deformable bristle
168 Line
170 Brush head
172 Suction line
174 Holder
176 Suction opening
200 Drive shaft extension
202 Hose
204 Movable shaft
206 Edge hole
208 Connection socket
210 Extension terminal

The invention claimed is:

1. A surgical cleaning device comprising:
a housing,
a drive shaft, wherein the drive shaft is rotatably mounted in the housing, wherein the drive shaft has a rear end for connection to a drive unit, and wherein the drive shaft has a front end arranged opposite the rear end,
a brush head, wherein the brush head has a plurality of elastically deformable bristles attached to the brush head, and wherein the brush head is arranged outside of the housing, a pump for pumping a rinsing liquid, wherein the pump is connected with the drive shaft and to be driven by the drive shaft,
a tube, wherein the brush head is arranged at a front end of the tube wherein the tube is arranged linearly movable against the housing and wherein the brush head has at least one ejection opening in the region of the elastically deformable bristles, wherein the tube opens liquid-permeably through at least one ejection opening in the direction of the elastically deformable bristles,
a gearbox, wherein the gearbox, is connected with the front end the drive shaft and with a rear end of the tube and wherein the gearbox translates the rotational movement of the drive shaft into an oscillating linear movement of the tube and the brush head,
wherein the pump is a self-aspirating pump that is connected directly with the drive shaft wherein the self-aspiring pump is arranged in the housing, and/or
the pump is an impeller pump which is arranged on the drive shaft wherein the impeller pump has a rotor with impeller blades wherein the rotor with the impeller blades is connected force and/or form-fitting with the drive shaft.

2. The surgical cleaning device according to claim 1, wherein:
the surgical cleaning device comprises a first liquid line wherein the first liquid line is liquid-permeably connected with the rear end of the tube and fixed at the rear end of the tube, and is fixed at one end opposite the rear end of the tube relative to the housing, wherein the first liquid line is a flexible movable hose connected firmly to the rear end of the tube at a first end of the hose.

3. A surgical cleaning device according to claim 1, wherein:
the housing has a handle for holding the surgical cleaning device with one hand, and wherein the housing has an opening for the rear end, the drive shaft, and/or the drive shaft is rotatable and driven by a separate drive unit, wherein the separate drive unit for this purpose is connected or connectible, detachably connected or connectible, with the rear end of the drive shaft.

4. A surgical cleaning device according to claim 1, wherein:
the surgical cleaning device is made of plastic, wherein the entire surgical cleaning device can be disposed of free of residue by combustion, and/or
the surgical cleaning device has a suction device with at least one suction opening in the region of the elastically deformable bristles wherein the suction device has a suction line that is connectible or is connected to a negative pressure source, wherein
the suction device is connected or connectible to a separator for separating solid components from the used rinsing liquid and/or the vacuum source has a vacuum pump which is part of the surgical cleaning device, and which can be driven by the drive shaft.

5. A surgical cleaning device according to claim 1, wherein:
the surgical cleaning device has a flexible drive shaft extension wherein the flexible drive shaft extension is connected or is connectible, to the rear end of the drive shaft, wherein the flexible drive shaft extension can be connected to an external drive unit, so that the drive shaft with the external drive unit via the flexible drive shaft extension is rotatable against the housing, and/or the brush head is a hollow body and the least one ejection opening connects an interior of the hollow body with the environment in the region of the elastically deformable bristles, wherein the tube opens into the at least one ejection opening via the interior of the hollow body.

6. A surgical cleaning device according to claim 1, wherein:

the surgical cleaning device has a resetting element with which the tube is pressed in the direction of the drive shaft, the resetting element being at least one coil spring, wherein particularly at least one spiral spring is arranged around the tube and/or around a shaft for connecting the tube with the gearbox and against the housing, wherein the gearbox has a first plate which is connected to the front end of the drive shaft or is attached to the front end of the drive shaft, wherein the first plate is oblique to the axis of rotation of the drive shaft, and the gearbox has a second plate wherein the second plate is connected with the rear end of the tube or the second plate or is attached to the rear end of the tube, and wherein the second plate is oblique to the longitudinal axis of the tube or oblique to the axis of rotation of the drive shaft and wherein the second plate is pressed against the first plate by the elastic resetting element.

7. A surgical cleaning device according to claim 1, wherein:

the gearbox has a plate at the front end of the drive shaft or at the rear end of the tube wherein the plate has a surface inclined against the rotary axis of the drive shaft, or the gearbox has a first plate at the front end of the drive shaft and a second plate at the rear end of the tube wherein the first plate and the second plate each have an inclined surface against the axis of rotation of the drive shaft, wherein the inclined surfaces of the first plate and the second plate are oriented to each other.

8. A surgical cleaning device according to claim 1, wherein:

the brush head is connected to the tube via a detachable connection and/or between the brush head and the tube or in the tube, a flexible bendable tube section is arranged, which allows the bending of the brush head against the longitudinal axis of the tube by up to 45°, wherein the flexibly bendable tube section is designed as a sleeve.

9. A surgical cleaning device according to claim 1, wherein:

a guide in the housing prevents a rotational movement of the tube against the housing, wherein the housing or a guide of the housing guide the linear movement of the tube, and/or at least one tubular elastic bristle is provided as one of at least one elastic bristles, wherein at least one tubular elastic bristle is hollow inside and liquid-permeably connected with the tube, wherein a free opening of at least one tubular elastic bristles is an ejection opening of the at least one ejection opening.

10. A surgical cleaning device according to claim 1, wherein:

at least one cam is attached to the drive shaft and an elastically deformable hose is connected to the rear end of the tube wherein the elastically deformable hose is arranged in the operative region of the cams in such a way that during a complete 360° rotation of the drive shaft, a rinsing liquid flow through the elastically deformable hose around its longitudinal axis is interrupted at least once per revolution of the drive shaft and thereby pulsating rinsing liquid jets from the at least one ejection opening are formed, and/or at least one ejection opening is shaped in such a manner and arranged relative to the elastically deformable bristles in such a way that a stream of rinsing liquid through at least one ejection opening is ejected into the effective range of the linearly oscillating elastically deformable bristles.

11. A surgical cleaning device comprising:

a housing;

a drive shaft, wherein the drive shaft is rotatably mounted in the housing, wherein the drive shaft has a rear end for connection to a drive unit, and wherein the drive shaft has a front end arranged opposite the rear end, a brush head, wherein the brush head has a plurality of elastically deformable bristles attached to the brush head, and wherein the brush head is arranged outside of the housing, a pump for pumping a rinsing liquid, wherein the pump is connected with the drive shaft and to be driven by the drive shaft, a tube, wherein the brush head is arranged at a front end of the tube wherein the tube is arranged linearly movable against the housing and wherein the brush head has at least one ejection opening in the region of the elastically deformable bristles, wherein the tube opens liquid-permeably through at least one ejection opening in the direction of the elastically deformable bristles, a gearbox, wherein the gearbox, is connected with the front end the drive shaft and with a rear end of the tube and wherein the gearbox translates the rotational movement of the drive shaft into an oscillating linear movement of the tube and the brush head, wherein the surgical cleaning device has a second liquid line wherein the second liquid line is connected with the pump in such a manner that a rinsing liquid from the pump can be sucked through the second liquid line into the pump and wherein the first liquid line is connected with the pump in such a manner that a rinsing liquid from the pump can be pressed out of the pump into the second liquid line, wherein the pump is connected with the drive shaft so that at least when the drive shaft is at a standstill, the second liquid line in the pump is separated from the first liquid line in liquid-impermeable manner or is sealed off, wherein during a rotational movement of the drive shaft, the second liquid line is liquid-conductively connected with the first liquid line.

\* \* \* \* \*